United States Patent
Sriram, I et al.

(10) Patent No.: US 7,975,264 B2
(45) Date of Patent: Jul. 5, 2011

(54) DEPLOYING PATCHES IN BATCH MODE TO FIX ERRORS IN PRE-INSTALLED SOFTWARE

(75) Inventors: Vijay Nichinbatl Sriram, I, Bangalore (IN); PhiDien Nguyen, II, San Jose, CA (US); Shamik Ganguly, III, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1199 days.

(21) Appl. No.: 11/626,351

(22) Filed: Jan. 23, 2007

(65) Prior Publication Data
US 2008/0178167 A1 Jul. 24, 2008

(51) Int. Cl.
*G06F 9/44* (2006.01)
(52) U.S. Cl. ........ 717/169; 717/170; 717/172; 717/175; 717/177
(58) Field of Classification Search ........................ None
See application file for complete search history.

(56) References Cited

U.S. PATENT DOCUMENTS

| | | | | |
|---|---|---|---|---|
| 6,363,524 | B1 * | 3/2002 | Loy | 717/170 |
| 6,477,703 | B1 * | 11/2002 | Smith et al. | 717/168 |
| 6,954,928 | B2 * | 10/2005 | Allsop et al. | 717/168 |
| 7,020,875 | B2 * | 3/2006 | Zweifel et al. | 717/168 |
| 7,552,430 | B2 * | 6/2009 | Napier et al. | 717/169 |
| 7,562,356 | B2 * | 7/2009 | DeFolo | 717/169 |
| 7,603,668 | B2 * | 10/2009 | Zweifel et al. | 717/174 |
| 7,765,538 | B2 * | 7/2010 | Zweifel et al. | 717/168 |
| 2006/0206757 | A1 * | 9/2006 | Russell et al. | 714/9 |
| 2007/0113225 | A1 * | 5/2007 | Felts | 717/172 |

* cited by examiner

*Primary Examiner* — Michael J Yigdall
(74) *Attorney, Agent, or Firm* — Narendra Reddy Thappeta

(57) ABSTRACT

In an embodiment of the present invention, a patch tool receives multiple patches, with each patch designed to fix a corresponding subset of a set of errors in a system. The patch tool determines a subset of patches, which together fix all of the set of errors, and deploys only the subset of patches in the system. The patches may be received over a period of time and the subset of patches are determined and deployed in a batch mode.

22 Claims, 17 Drawing Sheets

```
231: <oneoff_actions>
232: <acme.rdbms version="1.1" opt_req="R">
233:    <copy name="libocr10.so" path="%HOME%/lib" file_name="lib/libocr10.so"/>
234:    <jar name="aqxml.jar" path="%HOME%/rdbms/jlib"
                class_name="rdbms/jlib/aqxml.jar/oracle/AQ/xml/AQxmlError.class"/>
235:    <archive name="libserver10.a" path="%HOME%/lib" object_name="lib/libserver10.a/vsnf.o"/>
236: </acme.rdbms>
237: </oneoff_actions>

238: <oneoff_inventory>
239:    <reference_id number="1010111"/>
240:    <date_of_patch year="2006" month="Feb" day="18" time="16:16:25 hrs" zone="US/Pacific"/>
241:    <base_bugs>
242:       <bug number="1010222" description="Robust patchB see README.txt"/>
243:       <bug number="1010223" description="Bug description 1"/>
244:       <bug number="1010224" description="Bug description 2"/>
245:       <bug number="1010225" description="Bug description 3"/>
246:    </base_bugs>
247: </oneoff_inventory>
```

*FIG. 2B*

```
251: <oneoff_list>
252: <oneoff ref_id="1010111" xml_inv_loc="oneoffs/1010111/" act_inst_ver="1.1"
       install_time="2006.apr.20 1:00:25 PST">
253:   <desc></desc>
254:   <ref_list> <ref name="acme.rdbms" ver="1.1" home_idx="1"/> </ref_list>
255:   <bug_list>
256:     <bug>1010222</bug>
257:     <bug>1010223</bug>
258:     <bug>1010224</bug>
259:     <bug>1010225</bug>
260:   </bug_list>
261:   <file_list/>
262: </oneoff>
263: <oneoff ref_id="1020222" xml_inv_loc="oneoffs/1020222/" act_inst_ver="1.1"
       install_time="2006.jul.21 03:30:30 PST">
264:   <desc></desc>
265:   <ref_list> <ref name="acme.rdbms" ver="1.1" home_idx="1"/> </ref_list>
266:   <bug_list>
267:     <bug>1010111</bug>
268:     <bug>1010112</bug>
269:   </bug_list>
270:   <file_list/>
271: </oneoff>
272: </oneoff_list>
```

*FIG. 2C*

```
275: <oneoff_inventory>
276:   <reference_id number="1040444"/>
277:   <date_of_patch year="2006" month="Nov" day="31" time="09:30:40 hrs" zone="US/Pacific"/>
278:   <base_bugs>
279:     <bug number="1010223" description="Bug description 1"/>
280:     <bug number="1010224" description="Bug description 2"/>
281:     <bug number="1010227" description="Intermediate Patch description"/>
282:   </base_bugs>
283: </oneoff_inventory>
```

*FIG. 2D*

```
285: <oneoff_inventory>
286:   <reference_id number="1050555"/>
287:   <date_of_patch year="2006" month="Nov" day="31" time="09:30:40 hrs" zone="US/Pacific"/>
288:   <base_bugs>
289:     <bug number="1010222" description="Robust patchB see README.txt"/>
290:     <bug number="1010225" description="Bug description 3"/>
291:   </base_bugs>
292: </oneoff_inventory>
```

*FIG. 2E*

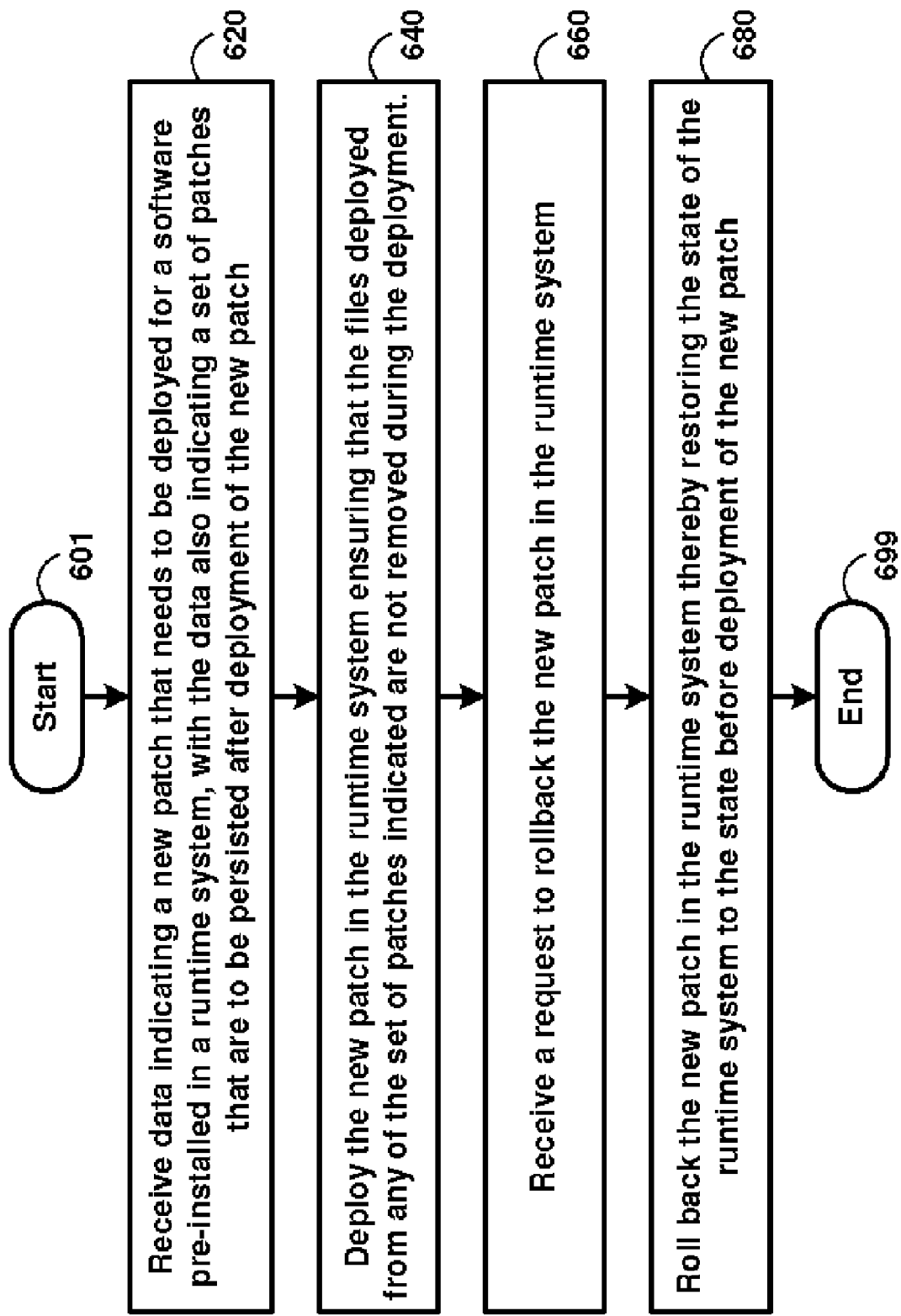

```
771: <oneoff_inventory>
772:   <reference_id number="1040444"/>
773:   <date_of_patch year="2003" month="Jan" day="01" time="04:57:12 hrs" zone="US/Eastern"/>
774:   <base_bugs>
775:     <bug number="1010222" description="Demo bug "/>
776:     <bug number="1030222" description="Demo bug "/>
777:     <bug number="1040222" description="Demo bug "/>
778:     <bug number="1040224" description="Demo bug "/>
779:   </base_bugs>
780:   <overlay_oneoffs>
781:     <overlay oneoff_id="1020222"/>
782:     <overlay oneoff_id="1030333"/>
783:   </overlay_oneoffs>
784:</oneoff_inventory>
```

*FIG. 7B*

```
931: <oneoff_actions>
932:   <acme.rdbms version="1.1" opt_req="R">
933:     <copy name="dbui2.jar" path="%ORACLE_HOME%/jlib/" file_name="jlib/dbui2.jar"/>
934:     <configfile file_name="/pcs.xml" component_type="OHSComponent"
                 service_name="PCS Service" document_type="xml"/>
935:     <configfile file_name="/httpd.conf" component_type="OHSComponent"
                 document_type="text"/>
936:     <configparam topology_path="OC4JComponent" mbean_name="AdminServerMBean"
                 param_name="timeout" param_value="5000"/>
937:   </acme.rdbms>
938: </oneoff_actions>
```

*FIG. 9B*

```
941: public class configfileAction extends PatchAction
942: {
943:     public configfileAction(PatchComponent pc, String fileName, String compType,
             String serviceName, String documentType, Integer lineNumber)
             throws NullPointerException, Exception, RuntimeException
944:     {
945:
946:         if(! DocumentType.equals("xml"))
947:             throw new RuntimeException.();
948:     }
949:     public configfileAction(PatchComponent pc, String fileName,
             String compType, String documentType, Integer lineNumber)
             throws NullPointerException, Exception, RuntimeException
950:     {
951:
952:     }
953: }
```

FIG. 9C

DEPLOYING PATCHES IN BATCH MODE TO FIX ERRORS IN PRE-INSTALLED SOFTWARE

RELATED APPLICATION

The present application is related to the co-pending U.S. patent application entitled, "Simplifying Rollback to Prior Versions of Patches Used to Fix Errors in Pre-installed Software", Ser. No.: UNASSIGNED, Filed: HEREWITH, naming the same inventors as in the subject patent application.

The present application is related to the co-pending U.S. patent application entitled, "Enhanced Flexibility in Deployment of Patches to Fix Errors in Pre-installed Software", Ser. No.: UNASSIGNED, Filed: HEREWITH, naming the same inventors as in the subject patent application.

BACKGROUND OF THE INVENTION

1. Field of the Invention

The present disclosure relates to software maintenance, and more specifically to a method and apparatus for deploying patches in batch mode to fix errors in pre-installed software.

2. Related Art

Pre-installed software represents software code/instructions that have been installed in a system. It is often observed that during the execution of software pre-installed in a system, various errors may be discovered. An error generally represents a deviation from a desired behavior of the system.

A patch generally represents a portion of a software that is used for fixing various errors. A patch may also be used to replace data/instructions in the pre-installed software to improve the performance of the pre-installed software, and such improvements are also treated as errors in the description herein.

Various aspects of the present invention assist in fixing of errors in pre-installed software using patches, as described below in further detail.

BRIEF DESCRIPTION OF THE DRAWINGS

Example embodiments of the present invention will be described with reference to the accompanying drawings briefly described below.

FIG. 2B depicts the content of the metadata of a patch that needs to be deployed in a runtime system in an embodiment.

FIG. 2C depicts the content of sample patch info indicating the patches deployed in a runtime system in an embodiment.

FIG. 2D depicts the content of the metadata of a patch having a conflict with a existing patch deployed in a runtime system in an embodiment.

FIG. 2E depicts the content of the metadata of a patch, which is a subset of an existing patch deployed in a runtime system in an embodiment.

FIG. 6 is a flowchart illustrating the manner in which files deployed from older patches are persisted even after deployment of new patches fixing the same errors (as the old patch) and also the manner in which such persistence simplifies rolling back to patches of prior versions in an embodiment of the present invention.

FIG. 7B depicts the content of a metadata of patch indicating the set of patches that are to be persisted during the deployment of the patch in a runtime system in an embodiment.

FIG. 9B depicts the content of the metadata of a patch that contains custom actions that are to be performed during the deployment of the patch in a runtime system in an embodiment.

FIG. 9C depicts the content of a file containing software instructions (coded in Java™ programming language) specifying a program logic to be executed for performing a custom action in an embodiment.

DESCRIPTION OF THE EXAMPLE EMBODIMENTS

I. Overview

A patch tool provided according to an aspect of the present invention receives multiple patches, with each patch designed to fix a corresponding subset of a set of errors in a system. The patch tool determines a subset of patches, which together fix all of the set of errors, and deploys only the subset of patches in the system. As a result, the aggregate time during which the system is unavailable may be reduced.

Another aspect of the present invention enables determination of the subset. In an embodiment, a patch tool considers the existing patches deployed in the system along with the received new patches (that have been received for deployment) to determine the subset of patches. The patch tool may remove some of the existing patches as a result of the selected patches in the subset.

The patch tool may also determine a conflict set indicating the patches that have conflicts (i.e., having overlap of changes as well as each having at least one unique change not in the other patch). The patches in the conflicts set may be sent to a developer for generating a merge patch, which effects all the changes of the patches in the conflicts set. The merge patch may then be received and deployed in the system.

Some of the patches may require that the files from older patches be removed from the system. Another aspect of the present invention provides a developer of a patch the flexibility to specify that a desired file from an older patch fixing a specific error, not be removed during deployment of a new patch designed to the fix the same specific error.

One more aspect of the present invention enables a developer to include a set of instructions (in a patch), which together cause a custom action to be performed, when executed during the deployment of the patch.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

II. Example Environment

II.A. Block Diagram

Figure 1:
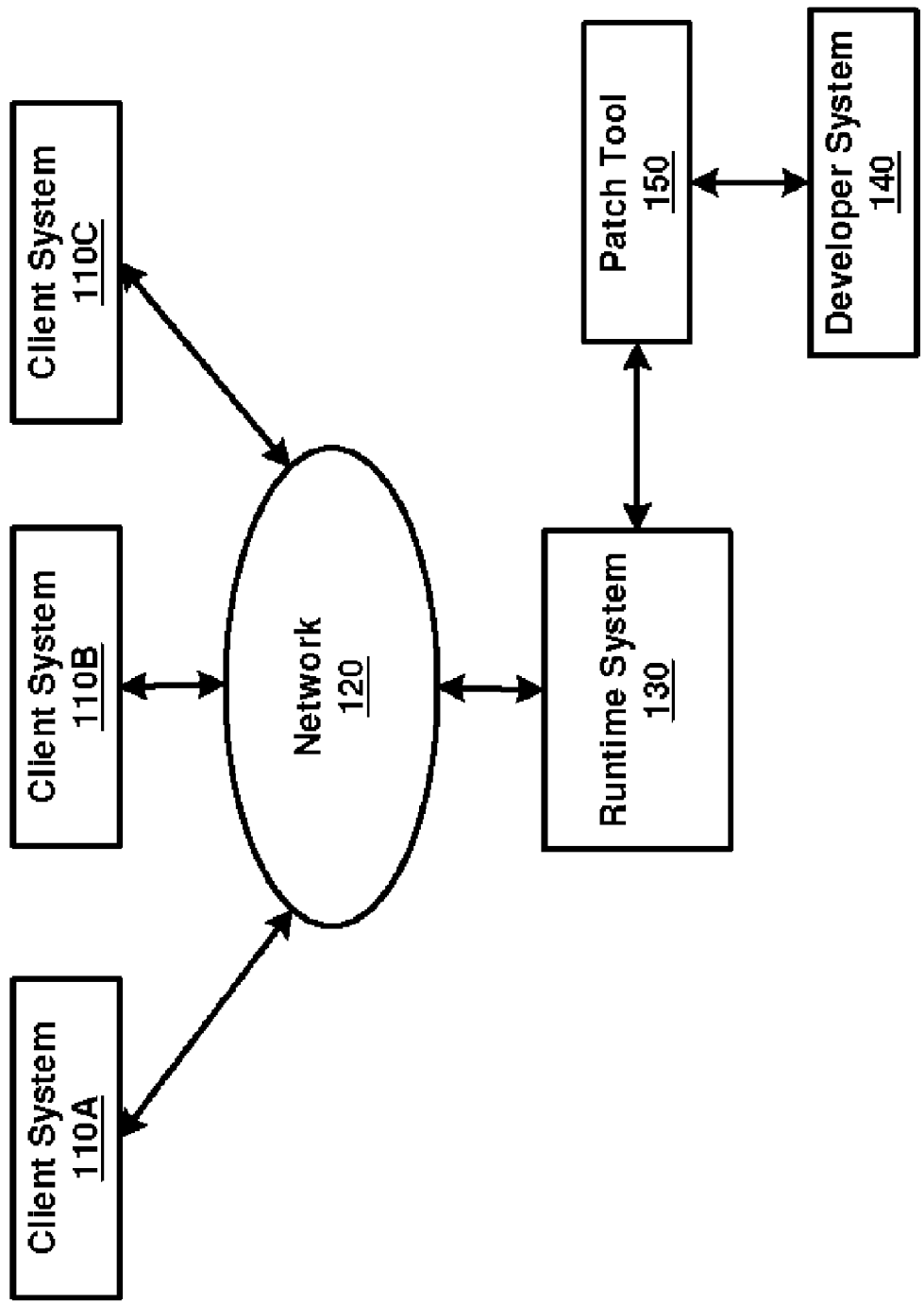
FIG. 1 is a block diagram illustrating an example environment in which several aspects of the present invention can be implemented.

FIG. 1 is a block diagram illustrating an example environment in which several aspects of the present invention can be implemented. The block diagram is shown containing client systems 110A-110C, network 120, runtime system 130, developer system 140 and patch tool 150. Merely for illustration, only representative number/type of systems are shown in the Figure. Many environments often contain more/less systems, both in number and type. Each system of FIG. 1 is described below in further detail.

Network 120 provides necessary communication between various client systems 110A-110C and runtime system 130. Network 120 may be implemented using protocols such as TCP/IP well known in the relevant arts.

Each of client systems 110A-110C represents a system such as a personal computer, workstation, mobile station, etc., and is used by a user to generate requests to runtime system 130. The requests may be generated according to a suitable interface. In general, a client system requests the runtime system for performing operations and receives corresponding responses containing the results of performance of the requested operations.

Runtime system 130 represents a system, such as a server, which contains pre-installed software capable of performing operations requested by client systems 110A-110C. The results of the operations are sent as corresponding responses to the requesting client systems.

It may be appreciated that during the performance of operations by the software pre-installed in the runtime system, various errors may be discovered. These errors may include logical errors (due to wrong logic), functional errors (due to the software not performing/functioning as expected) or runtime errors (due to problems with the environment in which the software is executed). Such errors (as well as any others detected) require changes to be made to the software instructions constituting the pre-installed software.

Developer system 140 enables users to generate patches to fix various errors in the pre-installed software in runtime system 130. The patches typically contain data elements, which replace corresponding data elements in the pre-installed software in runtime system 130. The data elements may represent software instructions or database schema type definitions, which fix different errors of the pre-installed software.

Patch tool 150 represents a system, which deploys the patches received from developer system 140 in runtime system 130. In general, patch tool 150 is implemented consistent with the format and conventions used in forming patches by developer system 140. Though patch tool 150 is shown external to runtime system 130, patch tool 150 may be integrated with runtime system 130 (or with developer system 140) as will be apparent to one skilled in the relevant arts by reading the disclosure provided herein.

Various features of the present invention facilitate deployment of patches for pre-installed software. Merely for illustration, the features are described with respect to an example approach to deploying patches, which is described in detail below.

II.B. Deploying a Patch

Figure 2A:
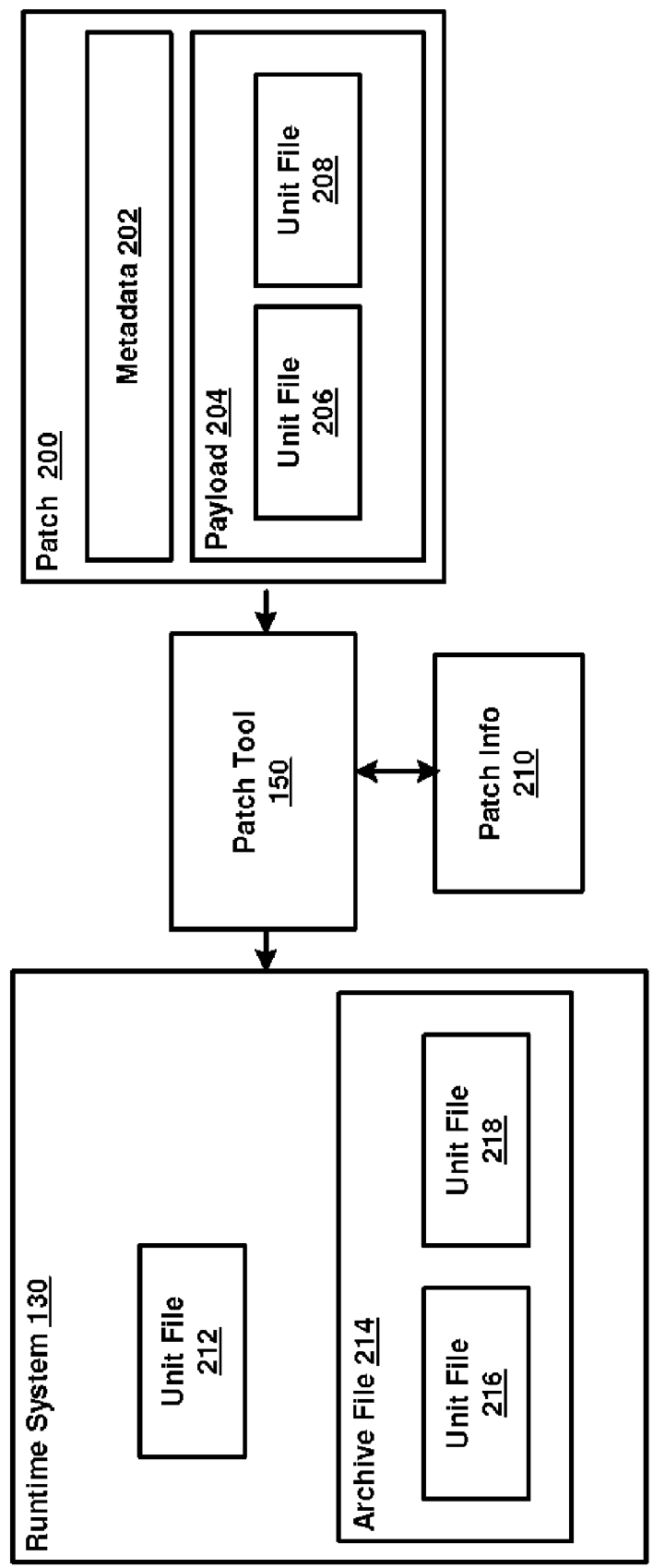
FIG. 2A is a block diagram illustrating the relationship of patches to various files in a runtime system in an embodiment.

FIGS. 2A, 2B and 2C together illustrate the manner in which a patch is deployed in an embodiment. Each of the figures is described in detail below.

In particular, FIG. 2A is a block diagram illustrating the relationship of patches to various files in a runtime system in an embodiment. The block diagram is shown with runtime system 130, patch tool 150, patch 200 and patch info (information) 210. Runtime system 130 is shown containing unit file 212 and archive file 214 (having unit files 216 and 218), described in further detail below.

As is well known in the relevant arts, a file represents a collection of data typically stored on a non-volatile memory identifiable by a name (file name). A file representing a single file is termed as a unit file to differentiate from an archive file, which contains one or more of such files (having corresponding file names) according to some convention/representation. Typically, the data representing an archive file needs to be processed (e.g., decompressed) to generate the corresponding unit files.

Unit file 212 and archive file 214 represent different types of files that may be present in runtime system 130. In an embodiment, archive file 214 represents a JAR (Java™ Archive file), and each of unit files 216 and 218 represents a class file containing software instructions coded according to Java™ programming language.

Thus, each of unit files 212, 216, 218 may contain software instructions (data elements consistent with a language suitable for execution) that are executed in runtime system 130 to provide the various operations requested by client systems 110A-110C. During execution, errors may be discovered in the software instructions thereby requiring the corresponding files to be replaced and/or software instructions to be changed.

In the embodiment described below, the files that contain software instructions causing the errors (such as unit files 212, 216 and 218) are replaced with corresponding files (such as unit files 206 and 208) contained in patch 200. It may be appreciated that in alternative embodiments, individual or groups of software instructions contained in specific files are replaced with corresponding software instructions contained in a patch.

Patch 200 is shown containing metadata 202 and payload 204 (having unit files 206 and 208). Merely for illustration, only representative number/type of files is shown in FIG. 2A. Many environments often contain many more (potentially less, as well) patches and/or files, both in number and type. Each of the blocks is described in detail below.

Patch info 210 contains data indicating the patches deployed in runtime system 130 and may be used to rollback the patches (that is remove the patches) from runtime system 130. The detail of a portion of patch info 210 in an embodiment is described in sections below.

Patch 200 contains various data elements and instructions for fixing errors in runtime system 130. In an embodiment, patch 200 is received from developer system 140 and contains files to be deployed and data indicating the actions to be performed with the files during deployment. Payload 204 represents files (such as unit files 206 and 208) that need to be deployed. The files in payload 204 are used to replace corresponding files in runtime system 130 according to the action specified in metadata 202.

Metadata 202 indicates the actions to be performed with the files in payload 204 during deployment. In an embodiment, the actions specify replacement of files in runtime system 130 with corresponding files in payload 204. Metadata 202 also indicates the errors fixed by the deployment of patch 200. The errors are used to identify the set of changes effected by a patch. As such the errors (or the corresponding identifiers) may be used by patch tool 150 to rollback the patch from runtime system 130. Though shown along with payload 204, it should be appreciated that metadata 202 can be received from separately (for example, in separate packets, but with some convention, such as with the same patch identifier, to correlate to the payload). The description is continued with respect to the details of a sample metadata of a patch in an embodiment.

II.C. Metadata in a Patch

FIG. 2B depicts the content of the metadata of a patch (200) that needs to be deployed in a runtime system (130) in an embodiment. Though the content is shown encoded in extensible markup language (XML), other encoding/formats may be used for representing the metadata. Lines 231-237 (between tags "<oneoff_actions>" and "</oneoff_actions>") depict the actions to be performed with the files specified in payload 204. Lines 232-236 (between tags "<acme.rdbms>" and "</acme.rdbms>") specify that the patching is being performed for the pre-installed software "acme.rdbms" with version "1.1" in runtime system 130.

In line 233, the action is specified as "copy" indicating that the file (with file name "lib/libocr10.so") in payload 204 is to be copied to runtime system 130 in the directory "%HOME%/lib" to replace the file "libocr10.so". In line 234, the action is specified as "jar" indicating that the class file "rdbms/jlib/aqxml.jar/oracle/AQ/xml/AQxmlError.class" contained in the archive file ("aqxml.jar" located in the directory "%HOME%/rdbms/jlib") in runtime system 130 is to be replaced with a corresponding class file (having the same name "AQxmlError.class") contained in payload 204. Similarly, in line 235, the action is specified as "archive" indicating that the object file "lib/libserver10.a/vsnf.o" contained in the archive file ("libserver10.a" located in the directory "%HOME%/lib") in runtime system 130 is to be replaced with a corresponding object file (having the same name "vsnf.o") contained in payload 204.

Lines 238-247 (between tags "<oneoff_inventory>" and "</oneoff_inventory>") depict the details of the various errors fixed by patch 200. In line 239, patch 200 is associated with a unique reference number "1010111" identifying the patch. In line 240, the date (year "2006", month "Feb." and day "18") and time ("16:16:25" and zone "US/Pacific") represent a time stamp at which the patch was created in developer system 140.

Lines 241-246 (between tags "<base_bugs>" and "</base_bugs>") depict the details of the errors that are fixed (or to which the patch is directed) on deployment of the patch. Line 242 specifies the details of a single error (such as error number "1010222" and error description "Robust patchB see README.txt") fixed by deployment of patch 200 in runtime system 130.

The error number uniquely identifies the specific error sought to be fixed by the patch on the pre-installed software in the runtime system. A development team operating developer system 140 may assign unique identifiers for the patches and errors. Similarly, lines 243, 244 and 245 specify different errors with corresponding error numbers "1010223", "1010224", "1010225" and respective descriptions "Bug description 1", "Bug description 2" and "Bug description 3".

It may be appreciated that patch tool 150 may store the information about the patch deployed in patch info 210 for deployment of multiple patches. As such, the description is continued with respect to the detail of sample patch info in an embodiment.

II.D. Patch Information

FIG. 2C depicts the content of sample patch info indicating the patches deployed in a runtime system (130) in an embodiment. Though the content is shown encoded in extensible markup language (XML), other encoding/formats may be used for representing the patch info. Lines 251-272 (in between tags "<oneoff_list>" and "</oneoff_list>") depict different patches deployed in runtime system 130.

Lines 252-262 (in between tags "<oneoff>" and "</oneoff>") depict the details of a single patch (200) deployed in runtime system 130. Line 252 specifies various details of the patch such as the reference number "1010111" associated with the patch, the location "oneoffs/1010111/" of the metadata of the patch and the time "2006.apr.20 1:00:25 PST" when the patch was deployed.

It may be observed that the reference number "1010111" corresponds to the reference number of patch 200 specified in line 239. In line 253, the description ("") of the patch is specified (between tags "<desc>" and "</desc>"). In line 254, the name of pre-installed software "acme.rdbms" and version "1.1" for which the patch is deployed (between tags "<ref_list>" and "</ref_list>") in runtime system 130 is specified and corresponds to similar information specified in line 232.

Lines 255-260 (between tags "<bug_list>" and "</bug_list>") depict the details of the errors that are fixed on deployment of the patch ("1010111"). Lines 256-259 specifies the different errors (in each of the line between tags "<bug>" and "</bug>") such as "1010222", "1010223", "1010224" and "1010225" indicating the error numbers that have been fixed by the deployment of the patch. It may be observed that the error numbers in lines 256-259 correspond to the error numbers specified in lines 242-245. Line 261 indicates the files (no files are shown for simplicity) modified during the deployment of the patch. Similarly lines 263-271 depict the details of another patch with reference numbers "1020222" deployed in the runtime system.

Thus, patch tool 150 deploys patch 200 in runtime system 130 and stores corresponding information in patch info 210. The description is continued with an aspect of the present invention whereby multiple patches are deployed in a runtime system.

III. Deployment of Multiple Patches

III.A. Introduction

It is often desirable to deploy multiple patches in a batch mode, even if the patches are received interspersed over long time duration. For example, one patch may be received starting Monday 7 AM while another patch may be received starting Tuesday 9 PM. The patches thus received in an entire week may be deployed as a single batch over a weekend. The batch mode is in contrast to situations in which each patch is attempted to be deployed upon receipt.

Such batch deployment in runtime system 130 may facilitate deployment of patches during non-critical times (e.g., weekends when there may be fewer requests from client systems), in addition to reducing the effective aggregate unavailable time of runtime system 130.

An embodiment of the present invention facilitates efficient deployment of multiple patches, as described below in further detail.

III.B. Deploying Multiple Patches

Figure 3:
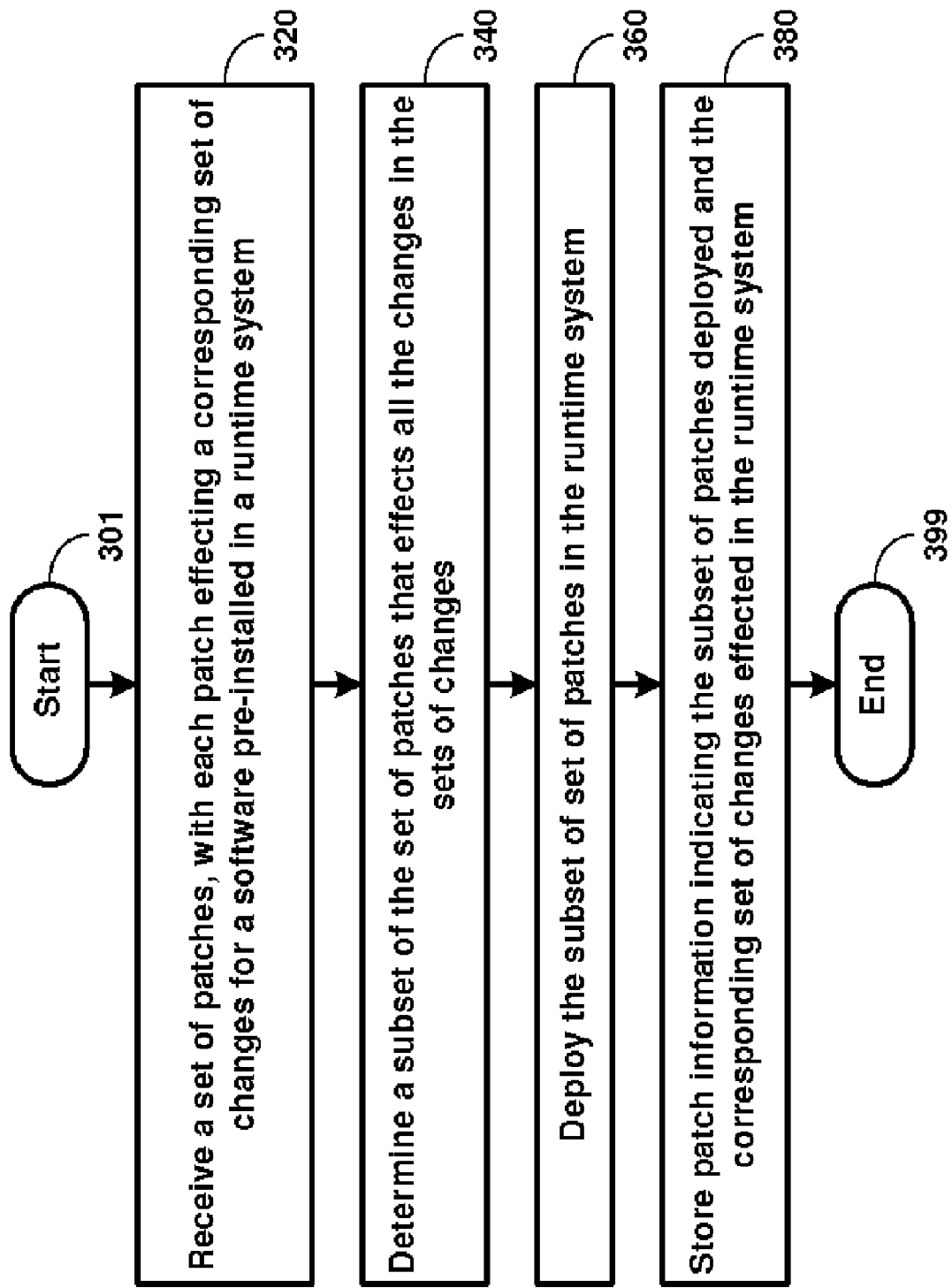
FIG. 3 is a flowchart illustrating the manner in which multiple patches are deployed in a runtime system according to an aspect of the present invention.

FIG. 3 is a flowchart illustrating the manner in which multiple patches are deployed in a runtime system according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, patch tool 150 receives a set of patches, with each patch effecting a corresponding set of changes for software pre-installed in a runtime system. The patches may be received from developer system 140. The set of changes for pre-installed software may be effected by the replacement of software instructions or data elements (or files containing them) in runtime system 130 with corresponding data from a patch. In an embodiment, the changes may be identified by error numbers corresponding to the errors that are fixed by a patch. Alternatively, the metadata in a patch may indicate the changes effected by a patch in runtime system 130.

In step 340, patch tool 150 determines a subset of the set of patches that effects all the changes in the sets of changes. Thus, if the changes designed by a given patch are effected by other patches intended to be included in the subset, the given patch may be ignored. In a simple case, when a patch is designed to effect a set of changes which contains all the changes designed to be effected by another patch, the another patch need not be deployed. In an embodiment, information on changes already effected by pre-deployed patches may be retrieved from patch information 210, and also used in determining the subset of the set of patches. An approach for determining the subset of patches is described in detail in sections below.

In step 360, patch tool 150 deploys the subset of the set of patches in the runtime system. The deployment of the subset of patches may be performed together (in a batch). It may be appreciated that the duration a runtime system is unavailable to client systems, is reduced due to the fewer patches deployed.

In step 380, patch tool 150 stores patching data indicating the subset of patches deployed and the corresponding set of changes affected in the runtime system. As described above, the stored data may be retrieved in step 320 to identify the existing patches that are already deployed in runtime system 130. The flow chart ends in step 399.

While the subset determined in step 340 potentially reduces the number of patches to be deployed, it may be desirable to avoid conflicts (described below) in selecting the members of the subset of patches, as described below with examples.

III.C. Conflicts

Another challenge in batch deployment is addressing conflicts presented by multiple patches. A conflict occurs when two different patches address overlapping changes, while each also effects at least one unique change not effected by the other.

Such conflicts are often of concern since the same change/error may be fixed in different manner, i.e., using different unit files or different instructions with the same file name. The other unit files in a payload may be designed to work in combination with the other changes effected by the rest of the payload (i.e., other unit files), but a portion of a payload fixing an error may not be able to operate with another portion in a conflicting patch, as illustrated with an example below.

FIG. 2D depicts the content of the metadata of a patch having a conflict with a existing patch deployed in a runtime system (130) in an embodiment. Lines 275-283 (similar to lines 238-247 of FIG. 2B and not explained for conciseness) depicts a patch with reference number "1040444" and fixing the error numbers "1010223", "1010224" and "1010227".

During deployment of the patch "1040444" (patch 44), the metadata of patch 44 is compared to the metadata of the existing patches in runtime system 130. The description is continued assuming that the existing patches in runtime system 130 are represented by the patches depicted in patch info 210 (shown in FIG. 2C).

It may observed that patch 44 fixes two errors "1010223" and "1010224 (as shown in lines 279 and 280) in common with patch "1010111" (patch 11) (as shown in lines 257 and 258). Also patch 11 fixes an error "1010222" (as shown in line 256) that is not fixed by patch 44 and patch 44 fixes an error "1010227" (as shown in line 281) not fixed by patch 11.

Given that the instructions for fixing error "1010223" in patch 44 need not be identical to the instructions in patch 11, the instructions for error "1010223" in patch 44 may not be compatible with the instructions in patch 11 fixing other errors such as "1010222". To avoid introducing additional errors, it is desirable that the code for error "1010223" in patch 44 not be installed with the instructions for fixing the other errors in patch 11. As such, there exists a conflict between patch "1010111" and patch "1040444".

In an embodiment, a conflict is resolved by informing a developer system about the conflicting patches. The developer system generates a new patch containing the changes of all the conflicting patches (that is a merge of the conflicting patches) and sends the new merged patch to the patch tool for deployment. Accordingly, it may be desirable to at least identify the conflicting patches while determining the subset of patches in step 340.

An aspect of the present invention enables such conflicts to be identified to the extent the errors cannot be fixed in a non-conflicting way.

One non-conflicting way is not including a first patch if the errors fixed by first patch are included in the set of errors fixed by the second patch, and if the second patch is included in the subset of patches determined in step 340. As such, the first patch is said to be a subset of the second patch (and conversely the second patch is said to be a superset of the first patch).

FIG. 2E depicts the content of the metadata of a patch, which is a subset of an existing patch deployed in a runtime system (130) in an embodiment. Lines 285-292 (similar to lines 238-247 of FIG. 2B and not explained for conciseness) depicts a patch with reference number "1050555" and fixing the error numbers "1010222", and "1010225".

Assuming the patch info shown in FIG. 2C represents the existing patches in runtime system 130, it may be observed that the errors fixed by patch "1050555" (as shown in lines 289 and 290) are also fixed by patch "1010111" (as shown in lines 256 and 259). As such, patch "1050555" is said to be a subset of patch "1010111" and conversely patch "1010111" is said to be a superset of patch "1050555".

Thus, during deployment of multiple patches, the patch tool 150 may need to verify whether the new patches (such as patch 200) to be deployed in runtime system 130 have a conflict with and/or are a superset/subset of existing patches in runtime system 130 by inspecting patch info 210.

In addition, it may be appreciated that in an embodiment implementing step 340, some of the existing patches already deployed in runtime system 130 may be determined to be not required for effecting the set of changes. As such, existing patches that are not required are rolled back before deployment of the subset of patches in step 360. The manner in which the subset of patches is determined based on such considerations and deployed is illustrated with an example below.

III.D. Example Illustrating Deployment of Multiple Patches

Figure 4:
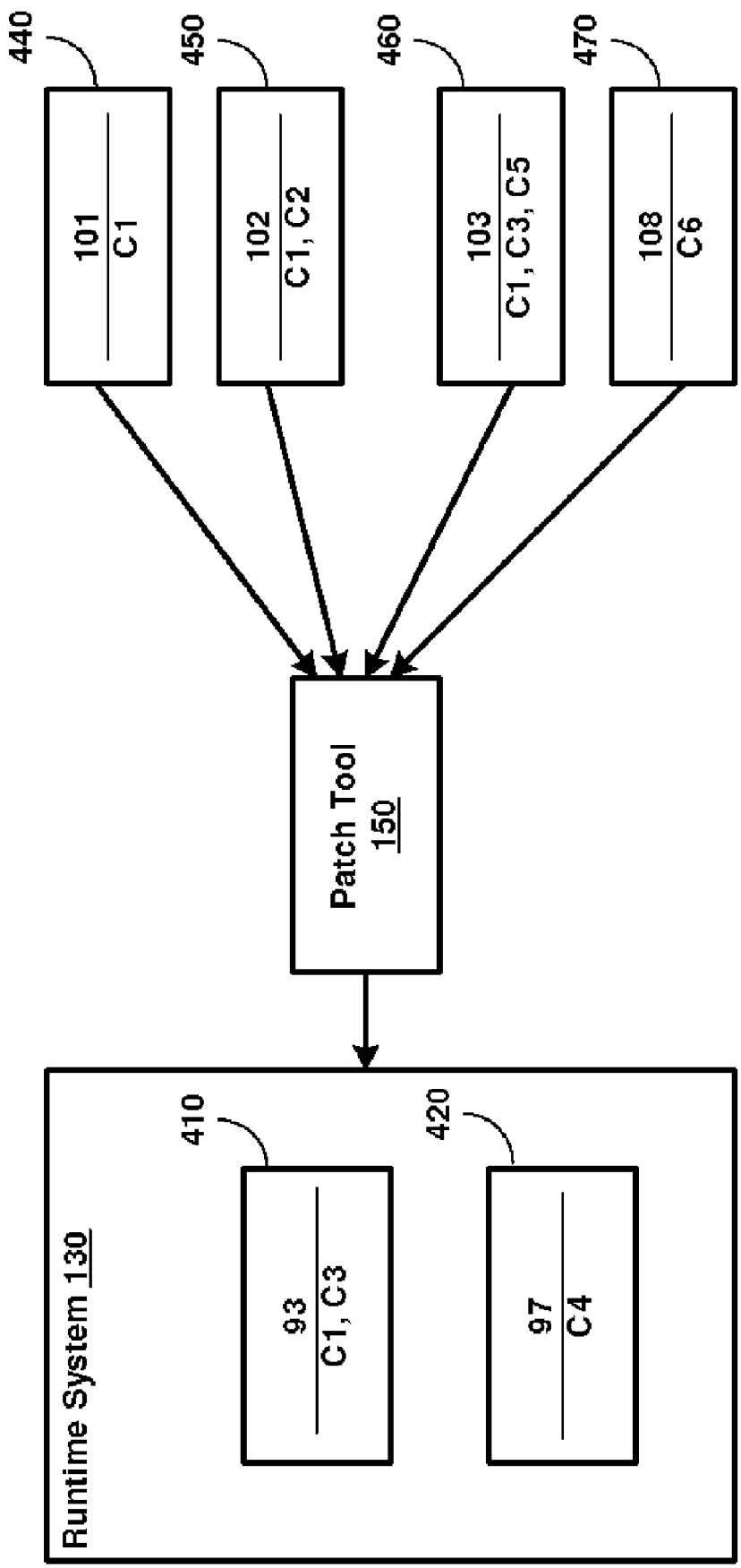
FIG. 4 is a block diagram illustrating deployment of multiple patches in an embodiment.

FIG. 4 is a block diagram illustrating deployment of multiple patches in an embodiment. The block diagram is shown containing runtime system 130 (containing existing patches 410 and 420), patch tool 150 and patches 440, 450, 460 and 470 that need to be deployed in the runtime system. Each of the blocks is described in detail below.

Patch 410 represents an existing (i.e., already deployed) patch in runtime system 130 and is shown containing a reference number "93" and the set of changes ("C1", "C3") effected by the patch in the runtime system. The reference number is used to uniquely identify each patch. As noted above, each of the changes (such as "C1" or "C3") corresponds to an error number (as specified in line 242) or may specify modifications made to software instructions constituting pre-installed software executing in the runtime system. Similarly, patch 420 is another patch that exists in runtime system 130 and has a reference number "97" and effects changes "C4" in runtime system 130. Patches 410 and 420 may be identified as existing patches in runtime system 130 from data specified in patch info (not shown in FIG. 4) associated with patch tool 150.

Patches 440 (reference number "101" and effecting changes "C1"), 450 (reference number "102" and effecting changes "C1" and "C2"), 460 (reference number "103" and effecting changes "C1", "C3" and "C5") and 470 (reference number "108" and effecting changes "C6") are the new patches that are to be deployed by patch tool 150 in runtime system 130.

It may be observed that patch 410 is a superset of patch 440, has a conflict with patch 450 and is a subset of patch 460. Patches 420 and 470 do not have a relation with any of the other patches. Also, patch 450 is a superset of patch 440 and has a conflict with patch 460. The above relations may be taken into consideration for determining the subset of patches to be deployed. The manner in which the subset of patches is determined is described in detail below.

III.E. Determining a Subset of Patches

Figure 5A:
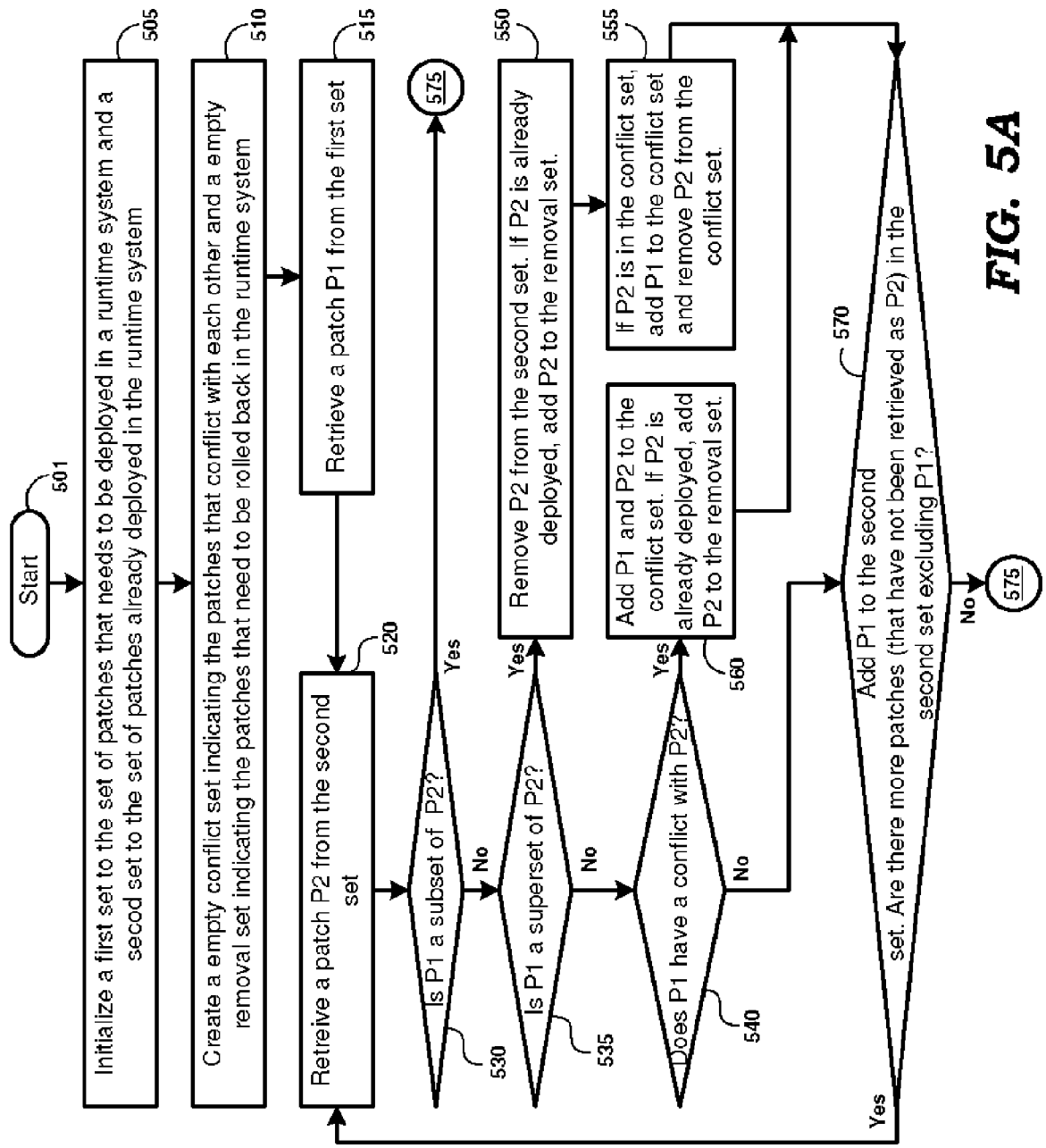
FIGS. 5A and 5B (henceforth conveniently referred to as FIG. 5) together represent a flowchart illustrating the manner in which a subset of patches to be deployed in a runtime system is determined in an embodiment.
Figure 5B:
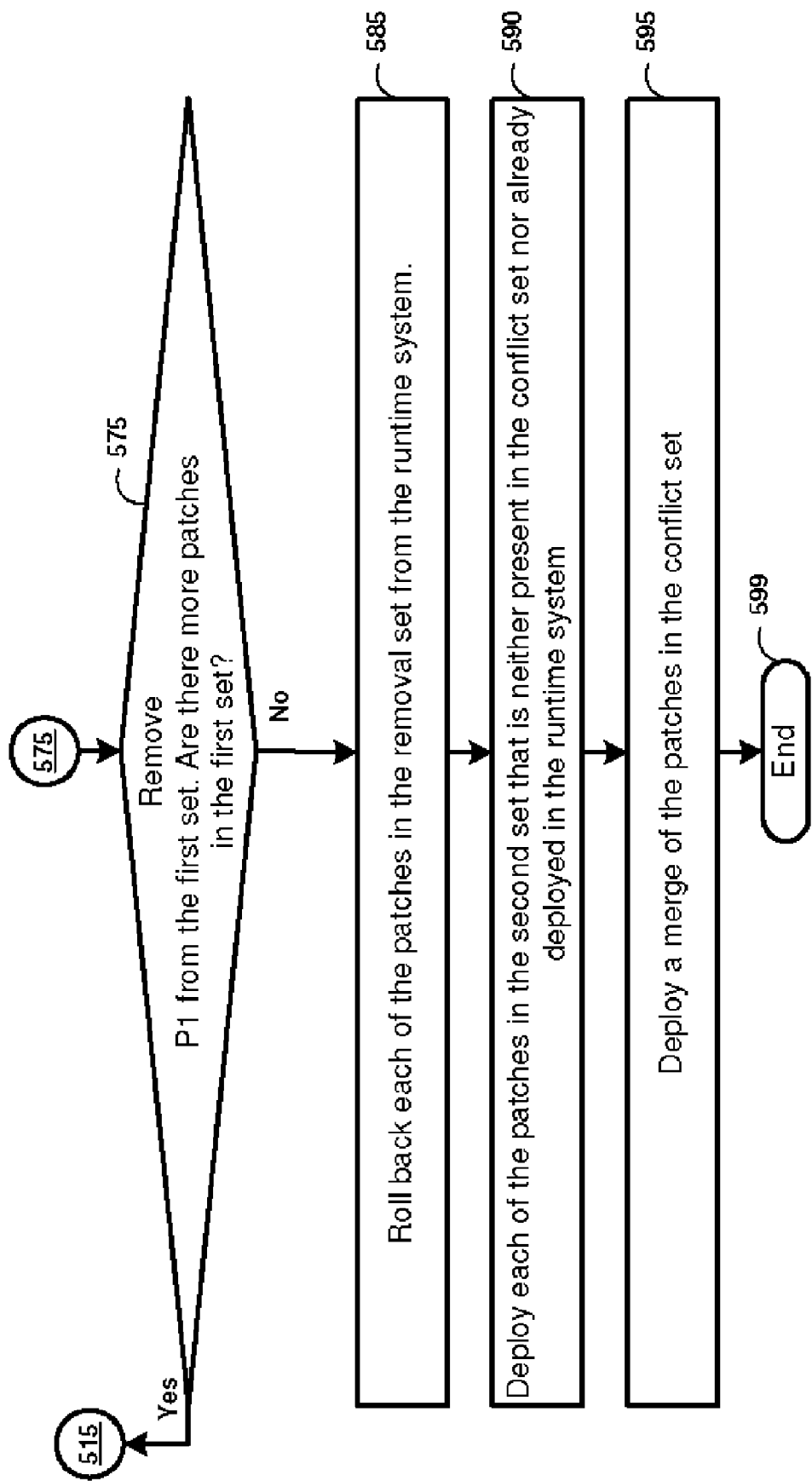

FIG. 5 (combination of FIGS. 5A and 5B) is a flowchart illustrating the manner in which a subset of patches to be deployed in a runtime system is determined in an embodiment. The flowchart is described with respect to FIG. 2 merely for illustration. However, various features can be implemented in other environments also without departing from the scope and spirit of various aspects of the present invention, as will be apparent to one skilled in the relevant arts by reading the disclosure provided herein. Some of the steps may be implemented in a different order than that depicted in FIG. 5. Many of such implementations are contemplated to be covered by several aspects of the present invention. The flow chart begins in step 501, in which control immediately passes to step 505.

In step 505, patch tool 150 initializes a first set to the set of patches that are available (or have been received) for deployment in a runtime system and a second set to the set of patches already deployed in the runtime system. The set of patches already deployed may be determined from the information in the patch info 210.

In step 510, patch tool 150 creates an empty conflict set and a empty removal set. As will be appreciated from the description below, the conflict set is updated to indicate the patches that conflict with each other, and the removal set indicates the patches that need to be rolled back in the runtime system.

In step 515, patch tool 150 retrieves a patch P1 from the first set. The patch P1 is then compared to each of the patches in the second set. In step 520, patch tool 150 retreives a patch P2 from the second set. Patch P2 is compared to patch P1 in steps 530, 535 and 540 and actions are performed based on the relation between patches P1 and P2, as described below.

In step 530, patch tool 150 checks whether P1 is a subset of P2. Patch P1 is determined to be a subset of patch P2 if the set of changes effected by patch P1 in runtime system 130 is contained in the set of changes effected by patch P2. In the scenario where P1 is a subset of P2, no action needs to be performed. As such, control passes to step 575 if P1 is a subset of P2 and to step 535 otherwise.

In step 535, patch tool 150 checks whether P1 is a superset of P2. Patch P1 is determined to be a superset of patch P2 if the set of changes effected by patch P1 in runtime system 130 contains all the set of changes effected by patch P2. Control passes to step 550 if P1 is a superset of P2 and to step 540 otherwise.

In step 550, patch tool 150 removes P2 from the second set. Patch tool 150 verifies whether P2 is already deployed in runtime sytem 130. In the scenario where patch P2 is already deployed, patch tool 150 adds patch P2 to the removal set. In step 555, patch tool 150 verifies whether P2 is in the conflict set. In the scenario where patch P2 is in the conflict set, patch tool 150 adds patch P1 to the conflict set and removes patch P2 from the conflict set. Control passes to step 570.

In step 540, patch tool 150 checks whether P1 has a conflict with P2. Patch P1 is determined to have a conflict with patch P2 if the set of changes effected by each of the patches overlap (that is have a common change effected), while each set effects unique changes not found in the other set. Control passes to step 560 if P1 is determined to have a conflict with P2 and to step 570 otherwise. In step 560, patch tool 150 adds P1 and P2 to the conflict set and verifies whether P2 is already deployed in runtime system 130. In the scenario where P2 is already deployed, patch P2 is added to the removal set. Control passes to step 570.

In step 570, patch tool 150 adds P1 to the second set. Patch tool 150 then determines whether there are more patches (that have not been retrieved as P2) in the second set excluding patch P1. Control passes to step 520 if there are more patches and to step 575 otherwise. Thus, in the steps between 520 and 570, each of the patches in the second set is identified as P2 and then compared to patch P1 and corresponding actions are performed based on the relation between patch P2 and patch P1.

In step 575, patch tool 150 removes patch P1 from the first set. Patch tool 150 then determines whether there are more patches in the first set. Control passes to step 515 if there are more patches in the first set and to step 580 otherwise. Thus, the steps between 515 and 575 are repeated for each patch in the first set (that is the set of new patches) and the subset of patches for effecting all the changes is determined.

In step 585, patch tool 150 rolls back each of the patches in the removal set from runtime system 130. In step 590, patch tool 150 deploys each patch in the second set that is neither in the conflict set nor already deployed in runtime system 130. In step 595, patch tool 150 deploys a merge of the patches in the conflict set. Patch tool 150 may request developer system 140 for the merge of the patches in the conflict set and may deploy the merged patch received as the response. The flow chart ends in step 599.

Thus, in steps 585, 590 and 595, the subset of patches for effecting all the changes as determined in the previous steps is deployed in runtime system 130. The description is continued illustrating the execution of steps in FIG. 5 in relation to the set of patches described in FIG. 4.

III.F. Illustrating Operation

In step 505, the first set is initialized to contain patches 440, 450, 460 and 470 (hereafter shown in the format "{440, 450, 460, 470}" to indicate that a set contains the patches specified in the braces}. The second set is initialized to {410, 420}. In step 510, a empty conflict set (that is { }) and a empty removal set (that is { }) is created.

During the first iteration, patch P1 is assigned 440 in step 515 and patch P2 is assigned 410 in step 520. In step 530, since patch P1 (440) is a subset of patch P2 (410), control passes to step 575. In step 575, P1 is removed from the first set and since P1 contains more patches control passes to step 515. At the end of the first iteration, first set is {450, 460, 470}, second set is {410, 420}, conflict set is { } (that is empty) and removal set is { }.

During the second iteration, patch P1 is assigned 450 in step 515 and patch P2 is assigned 410 in step 520. In step 530, control passes to step 535 since P1 is not a subset of P2 and in step 535 control passes to step 540 since P1 is not a superset of P2. In step 540, P1 (450) is determined to have a conflict with P2 (410) since the patches have change "C1" in common and also have unique patches ("C2" in patch 450 and "C3" in patch 410) that are not found in the other patch. As such, control passes to step 560.

In step 560, P1(450) and P2(410) are added to the conflict set. Patch P2(410) is also added to the removal set since the patch is already deployed in runtime system 130. Control then passes to step 570. In step 570, P1(450) is added to the second set. Control then passes to step 515 as there is a patch (420) that is not the same as P1. Thus, at the end of the second iteration, first set is {450, 460, 470}, second set is {410, 420, 450}, conflict set is {410, 450} and removal set is {410}.

During the third iteration, patch P1 is still 450 and patch P2 is assigned 420 in step 515. Since patch P1(450) and patch P2(420) have no relation to each other (that is there is no change commonly effected by both the patches), control passes through steps 530, 535, and 540 to step 570. In step 570, P1(450) is added to the second set. Since the second set already contains the patch, the patch is not duplicated. Control then passes to step 575 since there is no other patch in P2 to compare P1 with. In step 575, patch P1(450) is removed from the first set and control passes to step 515 since there are more patches in the first set. Thus, at the end of the third iteration, first set is {460, 470}, second set is {410, 420, 450}, conflict set is {410, 450} and removal set is {410}.

During the fourth iteration, patch P1 is assigned 460 in step 515 and patch P2 is assigned 410 in step 520. In step 530, control passes to step 535 since P1 is not a subset of P2. In step 535, control passes to step 550, since P1(460) is a superset of P2(410) as the changes ("C1", "C3" and "C5") effected by patch 440 contains all the changes ("C1" and "C3") effected by patch 410. In step 550, P2(410) is removed from the second set and is added to the removal set since P2(410) is already deployed in runtime system 130. In step 555, P2(410) is removed from the conflict set and P1(460) is added to the conflict set. Control passes to step 570, where P1(460) is added to the second set. Control passes to step 520, since there is a patch(420) that has not been retrieved as P2. Thus, at the end of the fourth iteration, first set is {460, 470}, second set is {420, 450, 460}, conflict set is {450, 460} and removal set is {410}.

During the fifth iteration, patch P1 is still 460 and patch P2 is assigned 420 in step 515. Since patch P1(460) and patch P2(420) have no relation to each other (that is there is no change commonly effected by both the patches), control passes through steps 530, 535, and 540 to step 570. In step 570, P1(460) is added to the second set. Control then passes to step 520 since there is a patch(450) in the second set that has not been retrieved as P2 (and is not the same as P1). Thus, at the end of the fifth iteration, first set is {460, 470}, second set is {420, 450, 460}, conflict set is {450, 460} and removal set is {410}.

During the sixth iteration, patch P1 is still 460 and patch P2 is assigned 450 in step 515. Control passed through steps 530, 535, 540 to step 560 since patch P1 has a conflict with patch P2 as the patches 460 and 450 have a change "C1" in common and also have unique changes ("C3" in patch 460 and "C2" in patch 450) not effected by the other patch. In step 560, P1(460) and P2(450) are added to the conflict set. Patch P2(450) is not added to the removal set since the patch is a new patch (and is not already deployed). Control then passes to step 570. In step 570, P1 (460) is added to the second set. Control then passes to step 575 since there is no other patch in P2 to compare P1 with. In step 575, patch P1(460) is removed from the first set and control passes to step 515 since there are more patches in the first set. Thus, at the end of the sixth iteration, first set is {470}, second set is {420, 450, 460}, conflict set is {450, 460} and removal set is {410}.

During the seventh iteration, patch P1 is assigned 470 in step 515 and patch P2 is assigned 420 in step 520. Since patch P1(470) and patch P2(420) have no relation to each other (that is there is no change commonly effected by both the patches), control passes through steps 530, 535, and 540 to step 570. In step 570, P1(470) is added to the second set. Control then passes to step 520 since there is a patch(450) in the second set that has not been retrieved as P2 (and is not the same as P1). Thus, at the end of the seventh iteration, first set is {470}, second set is {420, 450, 460, 470}, conflict set is {450, 460} and removal set is {410}.

Similarly, during the eighth iteration, patch P2 is assigned to 450 and control reaches step 570 from where control is passed to step 520 since there is a patch (460) which has not been retrieved as P2. At the end of the eighth iteration, first set is {470}, second set is {420, 450, 460, 470}, conflict set is {450, 460} and removal set is {410}. During the ninth iteration, patch P2 is assigned to 460 and control reaches step 570. In step 570, control passes to step 575, as there are no more patches in the second set that have not been retrieved as P2 and is not the same as P1. In step 575, patch P1(470) is removed from the first set. Control passes to step 580, since there are no more patches in the first set. Thus, at the end of the seventh iteration, first set is { }(that is empty), second set is {420, 450, 460, 470}, conflict set is {450, 460} and removal set is {410}.

In step 580, no action is performed since the conflict set contains more than one patch. In step 585, each of the patches in the removal set that is patch 410 is rolled back in runtime system 130. In step 590, the patches in the second set that are neither present in the conflict set nor already deployed are identified as {470}. As such, only patch 470 is deployed by patch tool 150 in step 590. In step 595, patch tool 150 deploys a merge of the patches 450 and 460 in runtime system 130.

It may be observed that all the changes are effected on deployment of patch 470 and a merged patch of patches 450 and 460 and the roll back of patch 410.

IV. Persistence of Files During Deployment of Patches

IV.A. Introduction

It is sometimes desirable to not remove ("persist") the files deployed from a old patch when a new patch fixing the same error as the old patch, is deployed in a runtime system. For example, during the deployment of new patches with a higher/newer version numbers, it may be desirable that the patch tool persist files deployed from older patches, which fixed the same errors in a lower/older version numbers. Such persistence of the previous changes may enable benefits such as easier reversion to patches of any one of the desired older versions.

Some other times it is desirable that files from older patches be removed when new patches are deployed. For example, as described above with respect to step 585 of FIG. 5, it is desirable that the changes corresponding to the patches in the removal set be rolled back prior to deploying the subset of patches noted there (leading to removal of corresponding files).

An aspect of the present invention facilitates such a combination of capabilities as described below.

IV.B. Simplifying Roll Back to Desired Prior Version

FIG. 6 is a flowchart illustrating the manner in which files deployed from older patches are persisted even after deployment of new patches fixing the same errors (as the old patch) and also the manner in which such persistence simplifies rolling back to patches of prior versions in an embodiment of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. Many of such implementations are contemplated to be covered by several aspects of the present invention. The flow chart begins in step 601, in which control immediately passes to step 620.

In step 620, patch tool 150 receives data indicating a new patch that needs to be deployed for a software pre-installed in a runtime system, with the data also indicating a set of patches (or specifically the corresponding files) that are to be persisted after deployment of the new patch. The set of patches may be indicated in the meta data of the new patch, as described in sections below.

In step 640, patch tool 150 deploys the new patch in the runtime system ensuring that the files deployed from any of the set of patches indicated are not removed during the deployment. In the embodiments described above, the files are determined by examining the information in patch information 210.

In step 660, patch tool 150 receives a request to rollback the new patch in the runtime system. The request can be received according to any pre-specified convention consistent with the implementation of patch tool 150.

In step 680, patch tool 150 rolls back the new patch in the runtime system thereby restoring the state of the runtime system to the state before deployment of the new patch. Such a rollback may merely entail removing the files corresponding to the new patch. The persistent files may become operative (executed) by appropriate changes in the rest of pre-installed software. The flow chart ends in step 699.

From the above, it may be appreciated that the ability to persist files when deploying patches may provide the benefit of reverting to a desired one of any prior versions of the preinstalled software. The description is continued with respect to an example approach to specifying the desired persistence.

IV.C. Specifying Desired Persistence

Figure 7A:
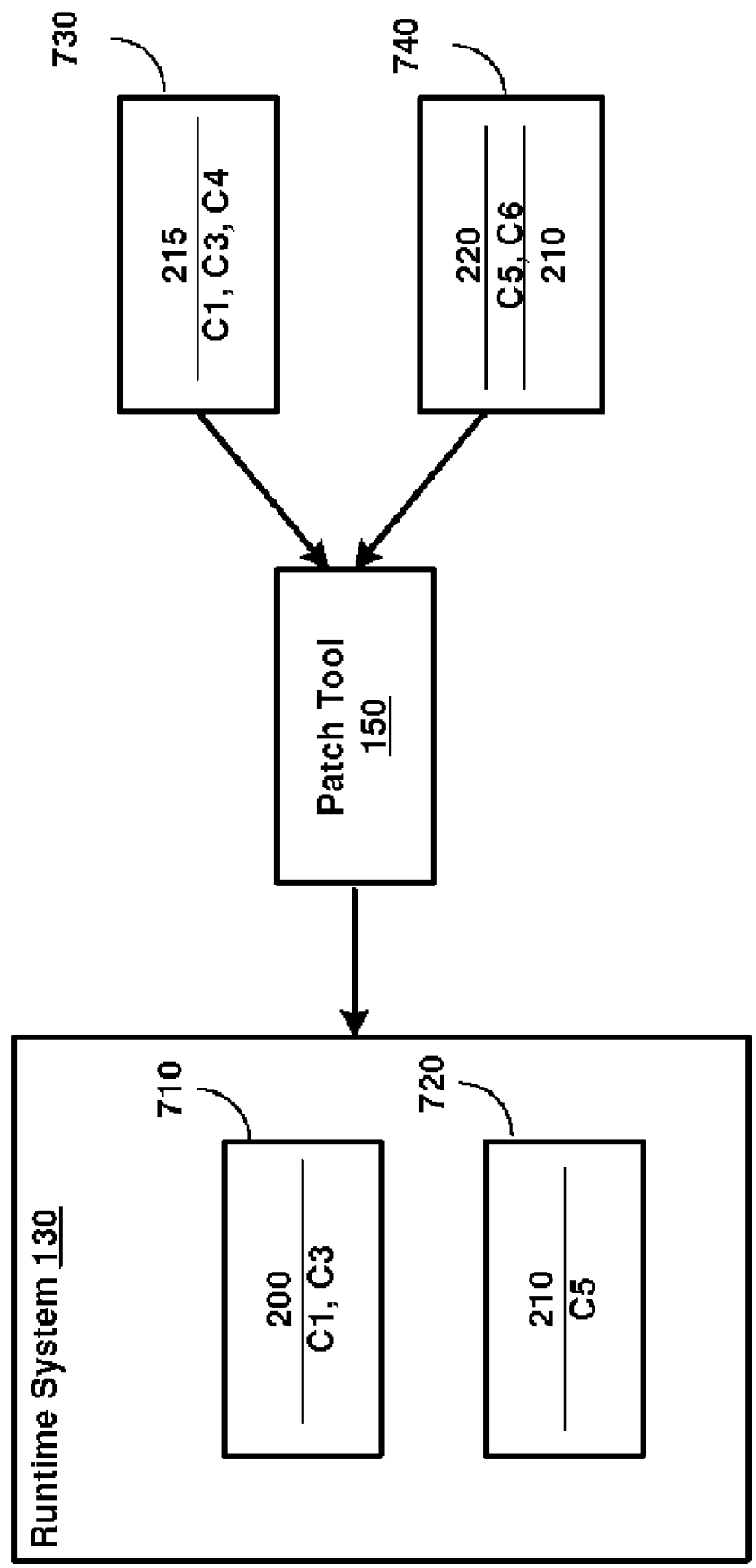
FIG. 7A is a block diagram illustrating persistence of pre-deployed files in a runtime system during the deployment of a new patch in an embodiment.

FIGS. 7A and 7B together illustrate the manner in which desired persistence can be specified during the deployment of a new patch in an embodiment. Each of the figures is described in detail below. In the description below, for simplicity, it is assumed that each change (e.g., C1, C2) represents one file (e.g., unit file or archive file, described above), though each change may be effected by multiple files.

FIG. 7A is a block diagram illustrating persistence of pre-deployed files in a runtime system (130) during the deployment of a new patch in an embodiment. The block diagram is shown containing runtime system 130 (containing pre-deployed patches 710 and 720), patch tool 150 and new patches 730 and 740. Merely for illustration, only representative number/type of patches is shown in the Figure. Many environments often contain many more patches and/or types, both in number and type. Each of the blocks is described in detail below.

Pre-deployed patches 710 and 720 represent patches with unique reference numbers "200" and "210". Patch 710 is shown as effecting changes "C1" and "C3", and patch 720 is shown effecting change "C5". Patch 730 represents a new patch that is to be deployed by patch tool 150 in runtime system 130 and is shown containing reference number "215" and effecting changes "C1", "C3" and "C4" (thereby fixing the errors fixed by patch 710 as well). Similarly, patch 740 also represents a new patch and is shown containing a reference number "220" and effecting changes "C5" and "C6" (thereby fixing the errors fixed by patch 720). Patch 740 also contains a set of patches (identified by reference numbers "210") that are to be persisted after the deployment of patch 740.

Assuming patch 730 is eventually deployed, patch 710 (and files corresponding to C1 and C3) is removed. On the other hand, since patch 740 indicates that patch 720 (identified by patch identifier 210) is to be persisted, the files corresponding to change C5 in run time system 130 are not removed assuming patch 740 is deployed.

It may be appreciated that during deployment of multiple patches, persistence information of the new patches to be deployed may be used to resolve conflicts between patches. Conflicting patches may be determined to be the patches included in the conflict set during the execution of the steps in the flowchart depicted in FIG. 5.

In an embodiment implementing the flowchart depicted in FIG. 5, an intermediate step between step 575 and 585 may be performed for checking the persistence information. In the scenario a new patch P1 has a conflict with an existing patch P2 and P1 indicates that P2 is to be persisted (during deployment of P1), P2 is not rolled back in step 585 and P1 is deployed in step 590. No merge of the patches P1 and P2 needs to be deployed in step 595.

The set of patches indicating the patches that are not to be rolled back during the deployment of a patch may be specified in the metadata of the patch as described in detail below with an example.

IV.D. Metadata for Persistence Information

FIG. 7B depicts the content of a metadata of patch (740) indicating the set of patches that are to be persisted during the deployment of the patch in a runtime system (130) in an embodiment. Though the content is shown encoded in extensible markup language (XML), other encoding/formats may be used for representing the metadata. Lines 771-779 and 784 are similar to corresponding lines 238-246 and line 247 of FIG. 2B (and are not explained in detail for conciseness) except in indicating a patch with reference number "1040444" which fixes the errors identified by the error numbers "1010222", "1030222", "1040222" and "1040224".

Lines 780-783 (in between tags "<overlay_oneoffs>" and "</overlay_oneoffs>") indicate the set of patches that are not to be rolled back during the deployment of patch "1040444". In lines 781 and 782, the reference numbers "1010222" and "1030333" of the set of patches is specified and correspond to the patches shown in lines 263-271 and 272-281 respectively. Thus during the deployment of patch "1040444", in the scenario where patches "1010222" and "1030333" are pre-deployed in runtime system 130, the patches are not rolled back.

Additional features may be provided to further aid developers of patches in designing patches to fix errors, as described below.

V. Performing Custom Action While Deploying Patches

V.A. Introduction

As may be readily observed from the description with respect to FIG. 2, keywords such as 'COPY', 'ARCHIVE', 'JAR' indicate the corresponding actions pre-determined according to a convention. However, a developer of patches (in developer system 140) may desire a sequence/set of actions not foreseen by the convention to deploy a patch. Such unforeseen (and not pre-determined) actions required to deploy a patch are referred to as custom actions.

V.B. Performing Custom Actions

Figure 8:
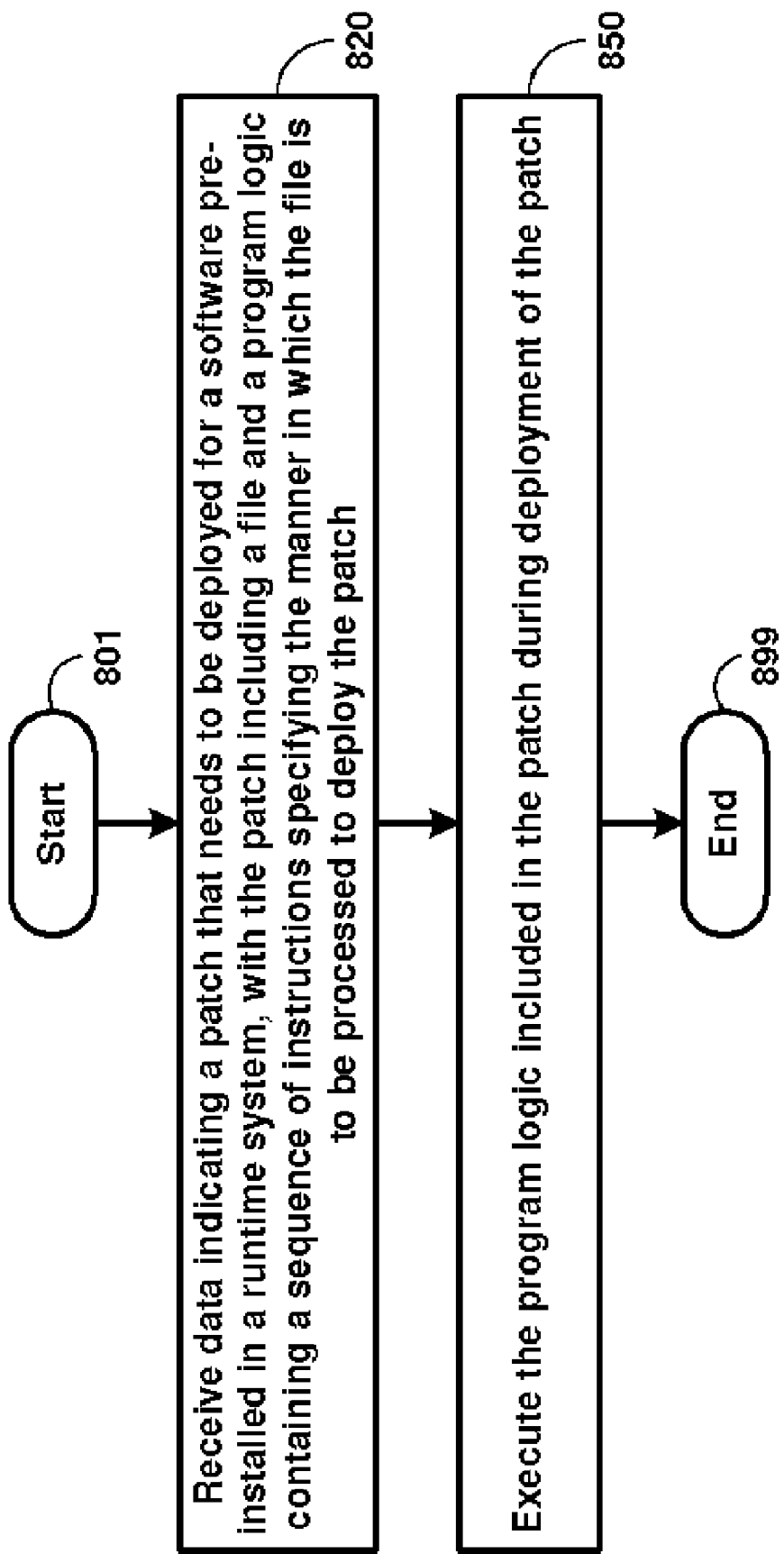
FIG. 8 is a flowchart illustrating the manner in which a designer of patches may cause custom actions to be performed during deployment of a patch in a runtime system according to an aspect of the present invention.

FIG. 8 is a flowchart illustrating the manner in which a designer of patches may cause custom actions to be performed during deployment of a patch in a runtime system according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein. Many of such implementations are contemplated to be covered by several aspects of the present invention. The flow chart begins in step 801, in which control immediately passes to step 820.

In step 820, patch tool 150 receives data indicating a patch that needs to be deployed for a software pre-installed in a runtime system, with the patch including a file and a program logic containing a sequence of instructions specifying the manner in which the file is to be processed to deploy the patch. The sequence of instructions is designed to perform a custom action when executed during deployment of the patch in runtime system 130.

In step 850, patch tool 150 executes the program logic included in the patch during the deployment of the patch. Any convention can be used to specify the specific instant at which the program logic is to be executed. The flowchart ends in step 899.

Thus, a custom action is caused to be performed by the patch tool by including a program logic in a patch and executing the program logic during the deployment of the patch. The manner in which the program logic is specified and executed is illustrated with an example below.

V.C. Illustrating Custom Actions

Figure 9A:
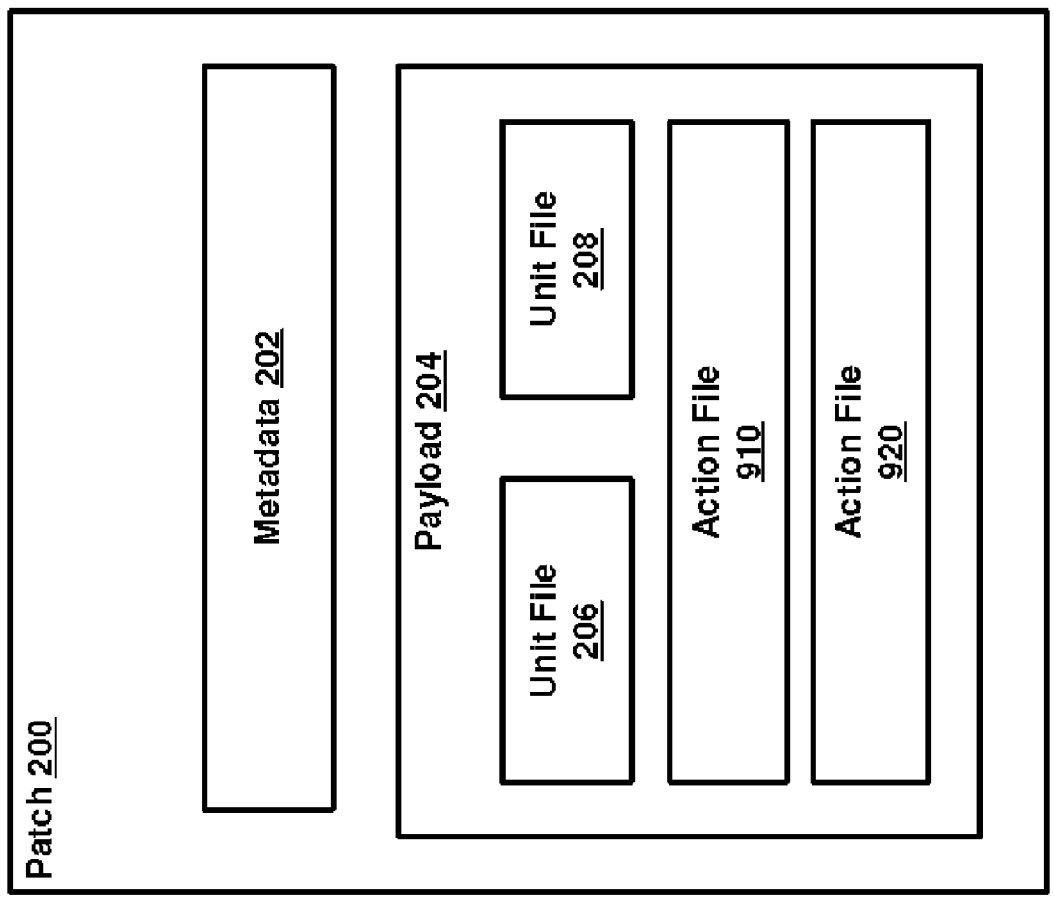
FIG. 9A is a block diagram illustrating a patch containing custom actions that are to be performed during the deployment of the patch in an embodiment.

FIGS. 9A, 9B and 9C together illustrate the manner in which a custom action is performed during the deployment of a patch in a runtime system in an embodiment. Each of the figures is described in detail below.

FIG. 9A is a block diagram illustrating a patch containing custom actions that are to be performed during the deployment of the patch in an embodiment. The block diagram is shown with patch 900 containing metadata 902 and payload 904. Payload 904 is shown containing unit files 906 and 908 (which are operate similar to 206 and 208 described above) and action files 910 and 920. Each of the blocks is described below.

Each of action files 910 and 920 contain software instructions (forming a corresponding program logic) designed to cause a corresponding custom action during deployment of patch 900.

Metadata 902 may contain keywords, which specify the pre-determined actions to be performed with unit files 906 and 908, in addition to indicating that the instructions in action files 910 and 920 are to be executed. The description is continued with respect to the details of the metadata of a patch containing custom actions in an embodiment.

V.D. Metadata of a Patch Containing Custom Actions

FIG. 9B depicts the content of the metadata of a patch (900) that contains custom actions that are to be performed during the deployment of the patch in a runtime system (130) in an embodiment. Though the content is shown encoded in extensible markup language (XML), other encoding/formats may be used for representing the metadata. Lines 931, 932, 937 and 938 are similar to lines 231, 232, 236 and 237 of FIG. 2B and are not described for conciseness.

Lines 933-936 depict various actions to be performed with the file in payload 904. Each of the lines 933-936 contains a keyword that indicates the action to be performed. For example, in line 933, the "copy" keyword indicates that a copy action (that is copying of files from payload 904 to runtime system 130) is to be performed.

On the other hand, to determine whether a keyword is designed to represent a custom action, patch tool 150 first determines whether the keyword belongs to a set of pre-defined keywords (corresponding to pre-defined actions). In the scenario where the keyword does not belong to the pre-defined set, patch tool 150 searches for files in payload 904 having a name formed by a string with the text "Action" suffixed to the keyword. Then, within such identified files, patch tool 150 determines a function having the same number of parameter as those specified in the tag being processed, as described below.

In line 934, keyword "configfile" indicates a custom action that is to be performed with parameters "file_name", "component type", "service_name" and "document type" with respective values "/pcs.xml", "OHSComponent", "PCS Service" and "xml" during deployment. Similarly, lines 935 and 936 depict keywords "configfile" and "configparam" indicating custom actions to be performed with respective parameters and values.

As the program logic (according to a programming language having syntax/semantics which are different from that used to represent the metadata) is specified in the form of instructions in Java™ programming language, patch tool 150 on identifying a custom action (such as "configfile") searches for a ".class" file having the text "Action" appended to the name of the custom action (that is, "configfileAction.class"). In the scenario such a file is found, the software instructions in the file are processed and the instructions specified for a function with the name similar to the filename (that is "configfileAction" function) is executed.

The description is continued with respect to example sequence of software instructions constituting a custom action.

V.E. Example Custom Action

FIG. 9C depicts the content of a file containing software instructions (coded in Java™ programming language) specifying a program logic to be executed for performing a custom action in an embodiment. Lines 941-953 depict software instructions coded in Java™ programming language contained in a file named "configfileAction.class".

Lines 943-948 depict a function "configfileAction" containing a program logic, which is executed to perform the custom action "configfile" specified in line 934. Some of the parameters (such as "fileName", "compType", "serviceName" and "documentType") of the function "configfileAction" are passed the corresponding values (such as "/pcs.xml", "OHSComponent", "PCS Service" and "xml") as specified in line 934.

Lines 949-952 specify another function with the same name "configfileAction" and accepting three values as parameters from the metadata. As such, patch tool 150 matches the "configAction" specified in line 935 with the function specified in lines 949-952 based on the number of values that are required for executing the function.

While the patches are described below as being deployed on runtime system 130 operating as a server, it should be appreciated that the patches can be deployed on various other systems such as personal computer, workstation, and mobile station, as well.

It should be appreciated that the features described above can be implemented in various embodiments as a desired combination of one or more of hardware, software and firmware. The description is continued with respect to an embodiment in which various features are operative when software instructions are executed.

VI. Digital Processing System

Figure 10:
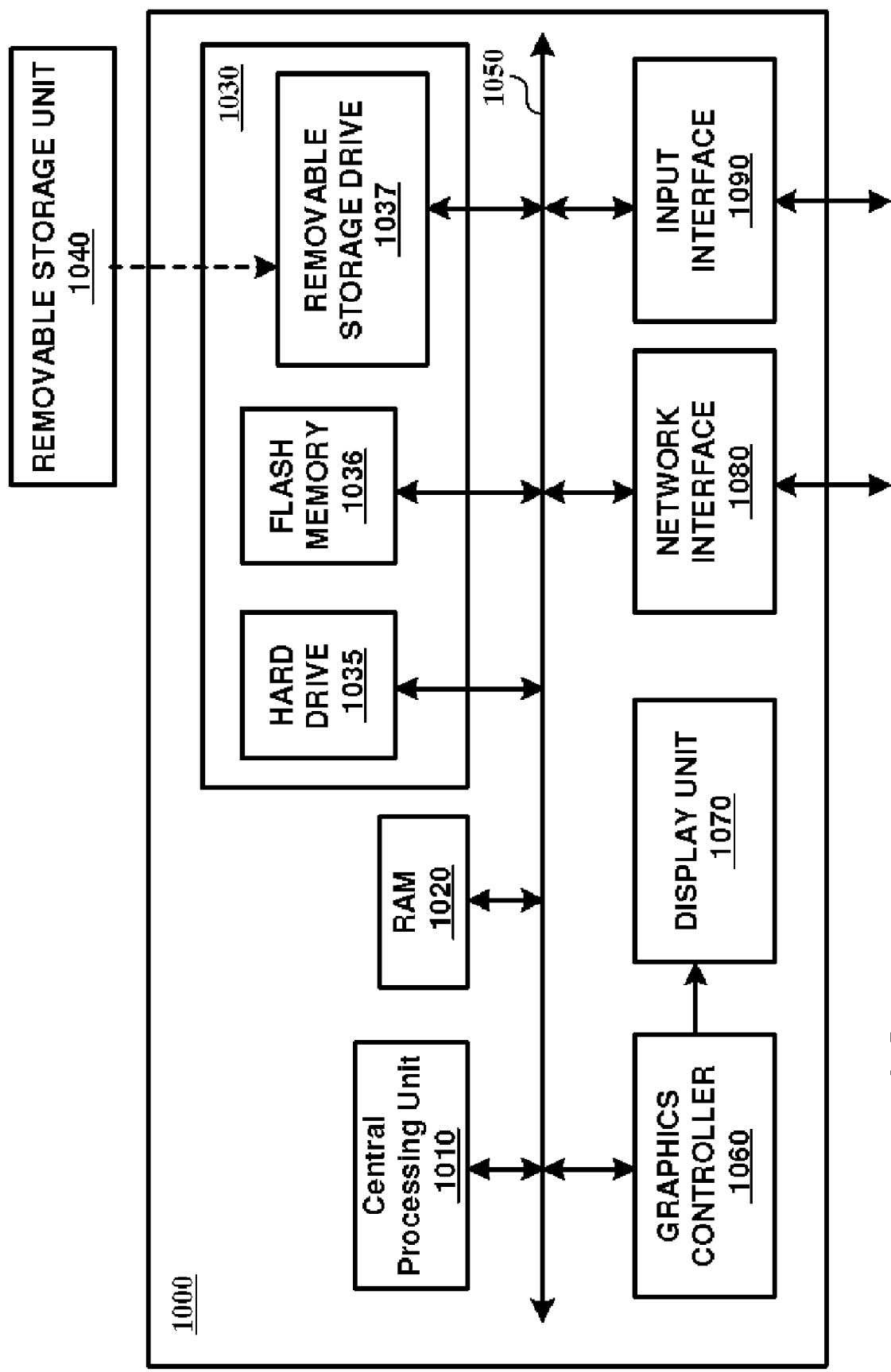
FIG. 10 is a block diagram illustrating the details of digital processing system in which various aspects of the present invention are operative by execution of appropriate software instructions In the drawings, like reference numbers generally indicate identical, functionally similar, and/or structurally similar elements. The drawing in which an element first appears is indicated by the leftmost digit(s) in the corresponding reference number.

FIG. 10 is a block diagram illustrating the details of digital processing system 1000 in which various aspects of the present invention are operative by execution of appropriate software instructions. System 1000 may correspond to patch tool 150 or developer system 140. System 1000 may contain one or more processors (such as a central processing unit (CPU) 1010), random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present invention. CPU 1010 may contain multiple processing units, with each processing unit potentially being designed for a specific task. Alternatively, CPU 1010 may contain only a single general purpose processing unit. RAM 1020 may receive instructions from secondary memory 1030 using communication path 1050.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse). Network interface 1080 provides connectivity to a network (e.g., using Internet Protocol), and may be used to communicate with others connected systems of FIG. 1.

Secondary memory 1030 may contain hard drive 1035, flash memory 1036 and removable storage drive 1037. Secondary memory 1030 may store the data (e.g., patch information 210) and software instructions (e.g., implementing the flowchart of FIG. 5A/5B), which enable system 1000 to provide several features in accordance with the present invention. Some or all of the data and instructions may be provided on removable storage unit 1040, and the data and instructions may be read and provided by removable storage drive 1037 to CPU 1010. Floppy drive, magnetic tape drive, CD-ROM drive, DVD Drive, Flash memory, removable memory chip (PCMCIA Card, EPROM) are examples of such removable storage drive 1037.

Removable storage unit 1040 may be implemented using medium and storage format compatible with removable storage drive 1037 such that removable storage drive 1037 can read the data and instructions. Thus, removable storage unit 1040 includes a computer readable storage medium having stored therein computer software and/or data. However, the computer readable storage medium can be in other forms (e.g., non-removable, random access, etc.).

In this document, the term "computer program product" is used to generally refer to removable storage unit 1040 or hard disk installed in hard drive 1035. These computer program products are means for providing software to system 1000. CPU 1010 may retrieve the software instructions, and execute the instructions to provide various features of the present invention described above.

VII. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A computer readable medium carrying one or more sequences of instructions constituting a patch tool for fixing a plurality of errors in a software pre-installed in a system, wherein execution of said one or more sequences of instructions by one or more processors causes said patch tool to perform the actions of:

receiving a plurality of patches, wherein each of said plurality of patches is designed to effect a corresponding one of a plurality of sets of changes and fix said plurality of errors when deployed;

determining a conflict set containing a third patch and a fourth patch of said plurality of patches, wherein said third patch is designed to effect a third subset of changes and said fourth patch is designed to effect a fourth subset of changes, said third subset and said fourth subject having at least one common overlapping change, said third subset and said fourth subset having at least one non-overlapping change that is present in one subset, but not in the other subset;

merging said third patch and said fourth patch into a merged patch; and deploying said merged patch in said system, in lieu of said third patch and said fourth patch, to effect all of the changes sought to be effected by both of said third patch and said fourth patch in said system.

2. The computer readable medium of claim 1, wherein said determining comprises one or more instructions for:

checking whether a first set of changes is a subset of a second set of changes, wherein said first set of changes are designed to be effected by a first patch and said second set of changes are designed to be effected by a second patch, wherein said first patch and said second patch are contained in said plurality of patches;

not including said first patch in a subset of patches if said second patch is contained in said subset of patches; and deploying said subset of patches along with said merged patch.

3. The computer readable medium of claim 2, wherein said receiving receives said plurality of patches interspersed in a long time duration, wherein said deploying deploys said subset of patches in a batch mode.

4. The computer readable medium of claim 2, wherein each of said plurality of patches comprises a set of files, each patch also containing a metadata specifying said corresponding set of changes effected by the patch, wherein said metadata specifies a corresponding set of files preinstalled in said system to be replaced by said set of files, wherein said deploying comprises replacing said corresponding set of files with said set of files.

5. The computer readable medium of claim 2, wherein each of said changes fixes a single error, wherein said metadata contains an error identifier uniquely identifying said single error, and wherein said conflict set is determined based on said error identifier.

6. The computer readable medium of claim 2, further comprising one or more instructions for:

maintaining a patch information indicating a set of existing patches pre-deployed in said system, said patch information also indicating a set of existing changes fixed by said set of existing patches, wherein said determining considers said set of existing changes in determination of said subset of patches.

7. The computer readable medium of claim 6, wherein said determining determines that a third patch contained in said set of existing patches is to be removed to effect the changes in all of said plurality of sets of changes, wherein said deploying comprises rolling back said third patch from said system to effect a reversal of a third set of changes corresponding to said third patch.

8. The computer readable medium of claim 7, wherein said determining determines to remove said third patch if a fourth patch is contained in said subset of patches, wherein said fourth patch is designed to effect a fourth set of changes which is a superset of said third set of changes.

9. The computer readable medium of claim 1, wherein said plurality of patches are received from a developer system, further comprising:

upon determining that said third patch and said fourth patch are a part of said conflict set, sending said conflict set, including both of said third patch and said fourth patch, to said developer system; and after sending of said third patch and said fourth patch to said developer system, receiving said merged patch containing all of the changes sought to be effected using said third patch and said fourth patch, wherein said deploying is performed after receiving said merged patch from said developer system.

10. A computer readable medium carrying one or more sequences of instructions constituting a patch tool for processing a plurality of patches, wherein each of said plurality of patches is designed to effect a corresponding one of a plurality of sets of changes and fix a plurality of errors when deployed in a system, wherein execution of said one or more sequences of instructions by one or more processors causes said patch tool to perform the actions of:

(a) initializing a first set to equal said plurality of patches, a second set to equal existing patches pre-deployed in said system, a removal set to empty set and a conflict set to empty set;

(b) identify one of a patches in said first set to a present patch P1;

(c) checking whether errors sought to be fixed by P1 are subset of a first single patch of said second set, and removing P1 from said first set if the errors sought to be fixed by P1 are already fixed by the single patch;

(d) checking whether errors sought to be fixed by P1 are a superset of a second single patch of said second set, and if the errors sought to be fixed by P1 are said superset:

(d.1) moving the second single patch from said second set to said removal set if said second single patch is already deployed in said system; and (d.2) if said second single patch is in said conflict set, removing said second single patch from said conflict set and add P1 to said conflict set;

(e) checking whether P1 has a conflict with any of the patches in said second set, wherein P1 is said to have a conflict with a third patch in said second set if both of said P1 and said third patch are designed to fix at least one common problem and at least one non-overlapping problem which is fixed by only one of said P1 and said third patch, but not both, and if there is said conflict:

(e.1) adding both of said P1 and said third patch to said conflict set; and (e.2) add said third patch to said removal set if said third patch is already deployed in said system;

(f) adding P1 to said second set if the errors sought to be fixed by P1 are already not fixed by the single patch;

(g) repeating (b)-(f) for each of the patches in said first set while setting P1 to the patch;

(h) after completing (g):

(h.1) roll back each of the patches in said removal set;

(h.2) deploy each of the patches in said second set that is neither present in said conflict set not already deployed in said system; and (h.3) deploy a merge of the patches in said conflict set.

11. A method of fixing a plurality of errors in a software pre-installed in a system, said method comprising:

receiving a plurality of patches, wherein each of said plurality of patches is designed to effect a corresponding one of a plurality of sets of changes and fix said plurality of errors when deployed;

determining a conflict set containing a third patch and a fourth patch of said plurality of patches, wherein said third patch is designed to effect a third subset of changes and said fourth patch is designed to effect a fourth subset of changes, said third subset and said fourth subject having at least one common overlapping change, said third subset and said fourth subset having at least one non-overlapping change that is present in one subset, but not in the other subset;

merging said third patch and said fourth patch into a merged patch; and deploying said merged patch in said system, in lieu of said third patch and said fourth patch, to effect all of the changes sought to be effected by both of said third patch and said fourth patch in said system.

12. The method of claim 11, wherein said determining comprises:
   checking whether a first set of changes is a subset of a second set of changes, wherein said first set of changes are designed to be effected by a first patch and said second set of changes are designed to be effected by a second patch, wherein said first patch and said second patch are contained in said plurality of patches;
   not including said first patch in a subset of patches if said second patch is contained in said subset of patches; and
   deploying said subset of patches along with said merged patch.

13. The method of claim 12, wherein said receiving receives said plurality of patches interspersed in a long time duration, wherein said deploying deploys said subset of patches in a batch mode.

14. The method of claim 12, further comprising:
   maintaining a patch information indicating a set of existing patches pre-deployed in said system, said patch information also indicating a set of existing changes fixed by said set of existing patches,
   wherein said determining considers said set of existing changes in determination of said subset of patches.

15. The method of claim 11, wherein said plurality of patches are received from a developer system, further comprising:
   upon determining that said third patch and said fourth patch are a part of said conflict set, sending said conflict set, including both of said third patch and said fourth patch, to said developer system; and
   after sending of said third patch and said fourth patch to said developer system, receiving said merged patch containing all of the changes sought to be effected using said third patch and said fourth patch,
   wherein said deploying is performed after receiving said merged patch from said developer system.

16. A method of processing a plurality of patches, wherein each of said plurality of patches is designed to effect a corresponding one of a plurality of sets of changes and fix a plurality of errors when deployed in a system, said method comprising:
   initializing a first set to equal said plurality of patches, a second set to equal existing patches pre-deployed in said system, a removal set to empty set and a conflict set to empty set;
   (b) identify one of a patches in said first set to a present patch P1;
   (c) checking whether errors sought to be fixed by P1 are subset of a first single patch of said second set, and removing P1 from said first set if the errors sought to be fixed by P1 are already fixed by the single patch;
   (d) checking whether errors sought to be fixed by P1 are a superset of a second single patch of said second set, and if the errors sought to be fixed by P1 are said superset:
      (d.1) moving the second single patch from said second set to said removal set if said second single patch is already deployed in said system; and
      (d.2) if said second single patch is in said conflict set, removing said second single patch from said conflict set and add P1 to said conflict set;
   (e) checking whether P1 has conflict with any of the patches in said second set, wherein P1 is said to have a conflict with a third patch in said second set if both of said P1 and said third patch are designed to fix at least one common problem and at least one non-overlapping problem which is fixed by only one of said P1 and said third patch, but not both, and if there is said conflict:
      (e.1) adding both of said P1 and said third patch to said conflict set; and
      (e.2) add said third patch to said removal set if said third patch is already deployed in said system;
   (f) adding P1 to said second set if the errors sought to be fixed by P1 are already not fixed by the single patch;
   (g) repeating (b)-(f) for each of the patches in said first set while setting P1 to the patch;
   (h) after completing (g):
      (h.1) roll back each of the patches in said removal set;
      (h.2) deploy each of the patches in said second set that is neither present in said conflict set not already deployed in said system; and
      (h.3) deploy a merge of the patches in said conflict set.

17. A digital processing system for fixing a plurality of errors in a software pre-installed in a system, said digital processing system comprising:
   a processor and a memory, said processor to execute instructions retrieved from said memory, wherein execution of said instructions causes said digital processing system to perform the actions of:
   receiving a plurality of patches, wherein each of said plurality of patches is designed to effect a corresponding one of a plurality of sets of changes and fix said plurality of errors when deployed;
   determining a conflict set containing a third patch and a fourth patch of said plurality of patches, wherein said third patch is designed to effect a third subset of changes and said fourth patch is designed to effect a fourth subset of changes, said third subset and said fourth subject having at least one common overlapping change, said third subset and said fourth subset having at least one non-overlapping change that is present in one subset, but not in the other subset;
   merging said third patch and said fourth patch into a merged patch; and
   deploying said merged patch in said system, in lieu of said third patch and said fourth patch, to effect all of the changes sought to be effected by both of said third patch and said fourth patch in said system.

18. The digital processing system of claim 17, wherein said determining comprises:
   checking whether a first set of changes is a subset of a second set of changes, wherein said first set of changes are designed to be effected by a first patch and said second set of changes are designed to be effected by a second patch, wherein said first patch and said second patch are contained in said plurality of patches; not including said first patch in a subset of patches if said second patch is contained in said subset of patches; and
   deploying said subset of patches along with said merged patch.

19. The digital processing system of claim 17, wherein said receiving receives said plurality of patches interspersed in a long time duration, wherein said deploying deploys said subset of patches in a batch mode.

20. The digital processing system of claim 19, further comprising:
   maintaining a patch information indicating a set of existing patches pre-deployed in said system, said patch information also indicating a set of existing changes fixed by said set of existing patches,
   wherein said determining considers said set of existing changes in determination of said subset of patches.

21. The digital processing system of claim 17, wherein said plurality of patches are received from a developer system, further comprising:

upon determining that said third patch and said fourth patch are a part of said conflict set, sending said conflict set, including both of said third patch and said fourth patch, to said developer system; and after sending of said third patch and said fourth patch to said developer system, receiving said merged patch containing all of the changes sought to be effected using said third patch and said fourth patch, wherein said deploying is performed after receiving said merged patch from said developer system.

22. A digital processing system for processing a plurality of patches, wherein each of said plurality of patches is designed to effect a corresponding one of a plurality of sets of changes and fix a plurality of errors when deployed in a system, said method comprising:

(a) initializing a first set to equal said plurality of patches, a second set to equal existing patches pre-deployed in said system, a removal set to empty set and a conflict set to empty set;

(b) identify one of a patches in said first set to a present patch P1;

(c) checking whether errors sought to be fixed by P1 are subset of a first single patch of said second set, and removing P1 from said first set if the errors sought to be fixed by P1 are already fixed by the single patch;

(d) checking whether errors sought to be fixed by P1 are a superset of a second single patch of said second set, and if the errors sought to be fixed by P1 are said superset:

(d.1) moving the second single patch from said second set to said removal set if said second single patch is already deployed in said system; and (d.2) if said second single patch is in said conflict set, removing said second single patch from said conflict set and add P1 to said conflict set;

(e) checking whether P1 has conflict with any of the patches in said second set, wherein P1 is said to have a conflict with a third patch in said second set if both of said P1 and said third patch are designed to fix at least one common problem and at least one non-overlapping problem which is fixed by only one of said P1 and said third patch, but not both, and if there is said conflict:

(e.1) adding both of said P1 and said third patch to said conflict set; and (e.2) add said third patch to said removal set if said third patch is already deployed in said system;

(f) adding P1 to said second set if the errors sought to be fixed by P1 are already not fixed by the single patch;

(g) repeating (b)-(f) for each of the patches in said first set while setting P1 to the patch;

(h) after completing (g):

(h.1) roll back each of the patches in said removal set;

(h.2) deploy each of the patches in said second set that is neither present in said conflict set not already deployed in said system; and (h.3) deploy a merge of the patches in said conflict set.

* * * * *

UNITED STATES PATENT AND TRADEMARK OFFICE
CERTIFICATE OF CORRECTION

| | | |
|---|---|---|
| PATENT NO. | : 7,975,264 B2 | Page 1 of 1 |
| APPLICATION NO. | : 11/626351 | |
| DATED | : July 5, 2011 | |
| INVENTOR(S) | : Sriram, I et al. | |

It is certified that error appears in the above-identified patent and that said Letters Patent is hereby corrected as shown below:

In column 10, line 18, delete "retreives" and insert -- retrieves --, therefor.

In column 10, line 37, delete "sytem" and insert -- system --, therefor.

In column 22, line 56, in Claim 19, delete "17," and insert -- 18, --, therefor.

Signed and Sealed this
Fifteenth Day of November, 2011

David J. Kappos
*Director of the United States Patent and Trademark Office*